United States Patent
Urai et al.

(10) Patent No.: US 6,259,992 B1
(45) Date of Patent: Jul. 10, 2001

(54) VEHICLE SAFETY RUNNING CONTROL SYSTEM

(75) Inventors: Yoshihiro Urai; Yoichi Sugimoto, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/324,735

(22) Filed: Jun. 3, 1999

(30) Foreign Application Priority Data

Jun. 3, 1998 (JP) .................................................. 10-170717
Jun. 3, 1998 (JP) .................................................. 10-170718

(51) Int. Cl.[7] .............................................. G06F 13/376
(52) U.S. Cl. .............................................. 701/301; 701/96
(58) Field of Search .............................. 701/96, 300, 301, 701/70; 340/436, 903, 435, 933; 180/169, 271, 170

(56) References Cited

U.S. PATENT DOCUMENTS

| | | | |
|---|---|---|---|
| 4,491,840 | * 1/1985 | Nishikawa et al. | 340/903 |
| 5,332,057 | * 7/1994 | Butsuen et al. | 180/169 |
| 5,461,357 | * 10/1995 | Yoshioka et al. | 340/435 |
| 5,477,461 | * 12/1995 | Waffler et al. | 364/461 |
| 5,510,990 | * 4/1996 | Hibino et al. | 364/426.04 |
| 5,586,031 | * 12/1996 | Fussl | 364/424.051 |
| 5,612,699 | * 3/1997 | Yamada | 342/70 |
| 5,678,650 | * 10/1997 | Ishihara et al. | 180/169 |
| 5,864,285 | * 1/1999 | Wieder et al. | 340/435 |
| 5,913,919 | * 6/1999 | Bbauer et al. | 701/301 |
| 5,977,869 | * 11/1999 | Andreas | 340/441 |

FOREIGN PATENT DOCUMENTS 6-298022   10/1994   (JP).

* cited by examiner

*Primary Examiner*—Tan Nguyen
*Assistant Examiner*—Dalena Tran
(74) *Attorney, Agent, or Firm*—Arent Fox Kintner Plotkin & Kahn, PLLC

(57) ABSTRACT

A system for controlling safety running of a vehicle, including obstacle detecting means such as a laser radar for detecting an obstacle (e.g., other vehicle) present ahead on a course of travel of the vehicle, and operating means for operating a braking system of the vehicle to avoid contact with the obstacle. In the system, if it is found that the obstacle detected by the obstacle detecting means is lost, the operating means operates the braking system based on at least an estimated possibility of contact or degree of certainty of obstacle. With the arrangement, the system can appropriately cope with a situation in which an obstacle, once detected, is lost during braking operation, without degrading the driving feeling or comfort and without causing the vehicle driver to experience annoyance, while ensuring obstacle avoidance without fail.

17 Claims, 24 Drawing Sheets

POSSIBLE RADAR DETECTION AREA

A1→INITIAL VALUE OF DEGREE TO 0.4

A2→INITIAL VALUE OF DEGREE TO 0.2

A3→INITIAL VALUE OF DEGREE TO 0

VEHICLE SAFETY RUNNING CONTROL SYSTEM

BACKGROUND OF THE INVENTION

1. Field of the Invention

This invention relates to a vehicle safety running control system, more particularly to a vehicle safety running control system which copes with a situation in which detection of an obstacle or object present ahead of the vehicle, once detected, becomes impossible or the obstacle is lost or missed, when an automatic braking system is operated so as to avoid contact with the obstacle.

2. Description of the Related Art

Various obstacle avoidance techniques have hitherto been proposed. For example, Japanese Laid-open Patent Application Hei 6(1994)-298022 teaches detecting the distance (relative distance) of an obstacle (e.g., another vehicle running ahead on the road) relative to the vehicle with the use of a detector such as a laser radar (lidar) and alerting the vehicle driver or automatically operating (i.e., independently of the vehicle operator's brake pedal manipulation) the braking system so as to avoid contact with the obstacle.

When the laser radar is used to detect an obstacle such as another vehicle running ahead on the road and the automatic braking system is operated in response to the obstacle detection, the obstacle may sometimes be lost or missed. For example, the obstacle may be out of radar sight if the vehicle (on which the laser radar is mounted) encounters great pitching. A similar situation happens if the laser radar breaks down or fails.

On this occasion, if the automatic braking operation is immediately terminated, the vehicle driver may feel annoyance and the possibility of contact with the obstacle may increase if the obstacle is, in fact, closing near. The automatic braking operation should preferably be continued in response to the situation.

On the other hand, however, there may be a case that the detected information itself is uncertain from the reason that, for example, the detection time was short and hence, the detection accuracy was low. Moreover, the obstacle might cross quickly before the vehicle and might go away. Thus, the obstacle might be absent. If this is the case, it is not necessary to continue the automatic braking operation. The continuation of automatic braking operation would rather degrade the driving feeling or comfort.

At any rate, indiscriminate vehicle deceleration change will, if not matched to the situation, degrade the driving feeling or comfort and cause the vehicle driver to experience annoyance. Moreover, rapid vehicle deceleration change would affect the vehicle driver's maneuver.

SUMMARY OF THE INVENTION

An object of the invention is therefore to overcome the foregoing problems and to provide a vehicle safety running control system which can appropriately cope with a situation in which an obstacle, once detected, is lost during automatic braking operation, thereby preventing the driving feeling or comfort from being degraded and the vehicle driver from experiencing annoyance, while ensuring obstacle avoidance without fail.

Another object of the invention is therefore to overcome the foregoing problems and to provide a vehicle safety running control system which can appropriately cope with a situation in which an obstacle, once detected, is lost, by determining the degree of certainty of obstacle and by controlling the operation of an automatic braking operation based on the determined degree of certainty, thereby preventing the driving feeling or comfort from being degraded and the vehicle driver from experiencing annoyance, while ensuring obstacle avoidance without fail.

To achieve these objects, the invention provides a system for controlling safety running of a vehicle, comprising an obstacle detecting means for detecting an obstacle present ahead on a course of travel of the vehicle; a braking system for braking the vehicle; vehicle speed detecting means for detecting a speed of the vehicle; relative distance determining means for determining a distance of the obstacle relative to the vehicle based on a detection result of the obstacle detecting means; relative speed detecting means for determining a speed of the obstacle relative to the vehicle based on a detection result of the obstacle detecting means; contact possibility determining means for determining possibility of contact with the obstacle based on the determined relative distance and relative speed; and braking system operating means for operating the braking system to brake the vehicle at the deceleration based on the determined possibility of contact; wherein, if the obstacle is lost when the braking system is being operated, the contact possibility determining means determines the possibility of contact based on a detection result of the obstacle detecting means obtained before the obstacle was lost.

BRIEF EXPLANATION OF THE DRAWINGS

This and other objects and advantages of the invention will be made more apparent with the following description and drawings, in which.

DETAILED DESCRIPTION OF THE PREFERRED EMBODIMENTS

Embodiments of the invention will now be explained with reference to the attached drawings.

Figure 1:
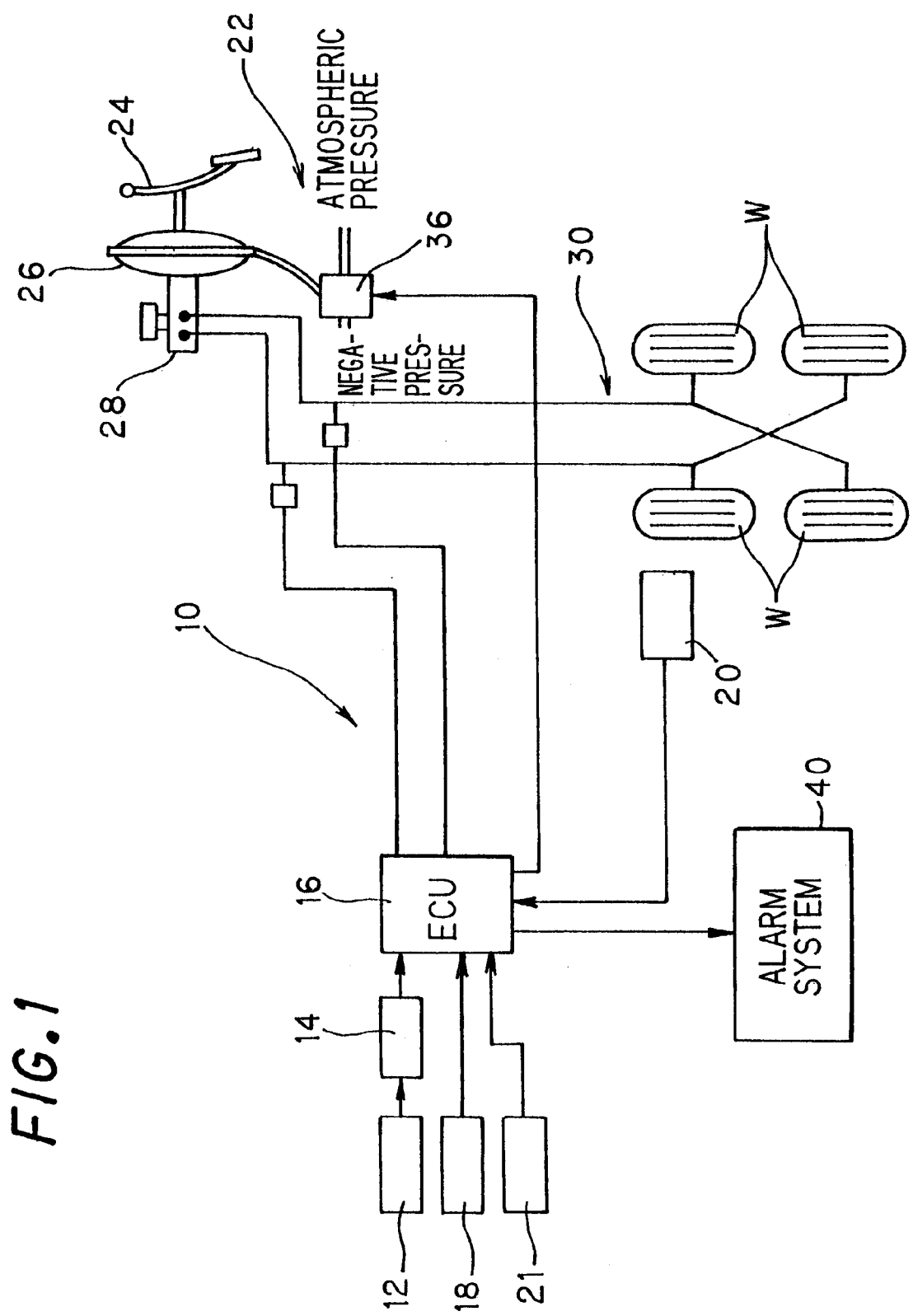
FIG. 1 is an overall schematic view showing the configuration of a vehicle safety running control system according to the invention.

FIG. 1 is an overall schematic view showing the configuration of a vehicle safety running control system according to the invention.

In the figures, reference numeral 10 designates a vehicle (partially illustrated by wheels W, etc.) having a steering mechanism (not shown) manipulated by the vehicle operator. A laser radar (or lidar) 12 which is mounted in the proximity of the headlight (not shown) emits a laser beam (a narrow beam of coherent, powerful and nearly nonchromatic electromagnetic radiation energy in the form of light) horizontally along the course of vehicle travel and receives an energy reflected from an obstacle or object (such as another vehicle present ahead of the subject vehicle 10).

The intensity of the reflected energy depends on the laser beam absorption of the target and is greatest when reflected by a reflector provided in a vehicle taillamp.

The laser radar 12 is connected to a radar output processing unit 14 which is comprised of a microcomputer. The radar output processing unit 14 detects the distance (relative distance) to an obstacle or object from the vehicle 10 by measuring the time interval between transmission of the energy and reception of the reflected energy, which establishes the range of the obstacle in the beam's path. Moreover, the laser radar output processing unit 14 detects the (relative) speed of the obstacle by differentiating the measured distance, and detects the direction or orientation of the obstacle from the reflected energy to obtain two-dimensional information describing the obstacle. The output of the laser radar processing unit 14 is forwarded to an ECU (Electronic Control Unit) 16 which is also comprised of a microcomputer.

It should be noted that the word "obstacle" means an object which presents as a barrier to the subject vehicle; typically another vehicle running ahead on the road.

A yaw rate sensor 18 is provided at the center of the vehicle 10 to generate a signal indicative of the yaw rate (yaw angular velocity acting at the center of gravity of the vehicle 10 about the gravitational or vertical direction). The output of the yaw rate sensor 18 is sent to the ECU 16.

A vehicle speed sensor 20 is provided in the proximity of a drive shaft (not shown) to generate a signal indicative of the vehicle (traveling or road) speed of the vehicle 10.

A steer angle sensor 21 is provided in the proximity of a steering wheel (not shown) of the steering manipulated mechanism to generate a signal indicative of the steer angle input by the vehicle driver. The outputs of the sensors 18, 20, 21 are sent to the ECU 16.

Reference numeral 22 indicates a braking system of the vehicle 10. In the braking system 22, a foot brake (brake pedal) 24 is connected, via a negative-pressure booster 26, to a master cylinder 28. The negative-pressure booster 26 has a diaphragm (not shown) which partitions the inside of the booster into two chambers such that the ratio of the negative pressure introduced from the engine intake system (not shown) to the atmospheric pressure introduced from outside of the engine is regulated to determine the position of the diaphragm which determines the force to boost the vehicle operator's brake pedal depression.

The master cylinder 28 supplies, via oil paths 30, hydraulic pressure (brake fluid pressure), at a pressure in response to the boosted braking force, to the brake (not shown) provided at the respective wheels W to slow or stop the rotation thereof. Thus, the vehicle is slowed and stopped at a rate of deceleration determined by the braking force.

An electromagnetic solenoid valve 36 is provided at an appropriate location of the introduction system of the negative pressure and atmospheric pressure (not fully shown). The electromagnetic solenoid valve 36 is connected, via a driver circuit (not shown), to the ECU 16 to receive a command signal (a duty-ratio signal in Pulse Width Modulation) generated by the ECU 16. The electromagnetic solenoid valve 36 opens/closes in response to the command signal to regulate the ratio of the negative pressure to the atmospheric pressure and operates the braking system 22 to automatically brake (i.e., to decelerate independently of the vehicle operator's brake pedal depression) the vehicle.

An alarm system (e.g., a visible indicator or audio system) 40 is provided in the proximity of the vehicle operator's seat (not shown) and is connected to the ECU 16 to receive a command signal, and alerts the vehicle operator in response to the command signal generated by the ECU 16.

The operation of the vehicle safety running control system according to the invention, more specifically the operation of the ECU 16 will next be explained.

Figure 2:
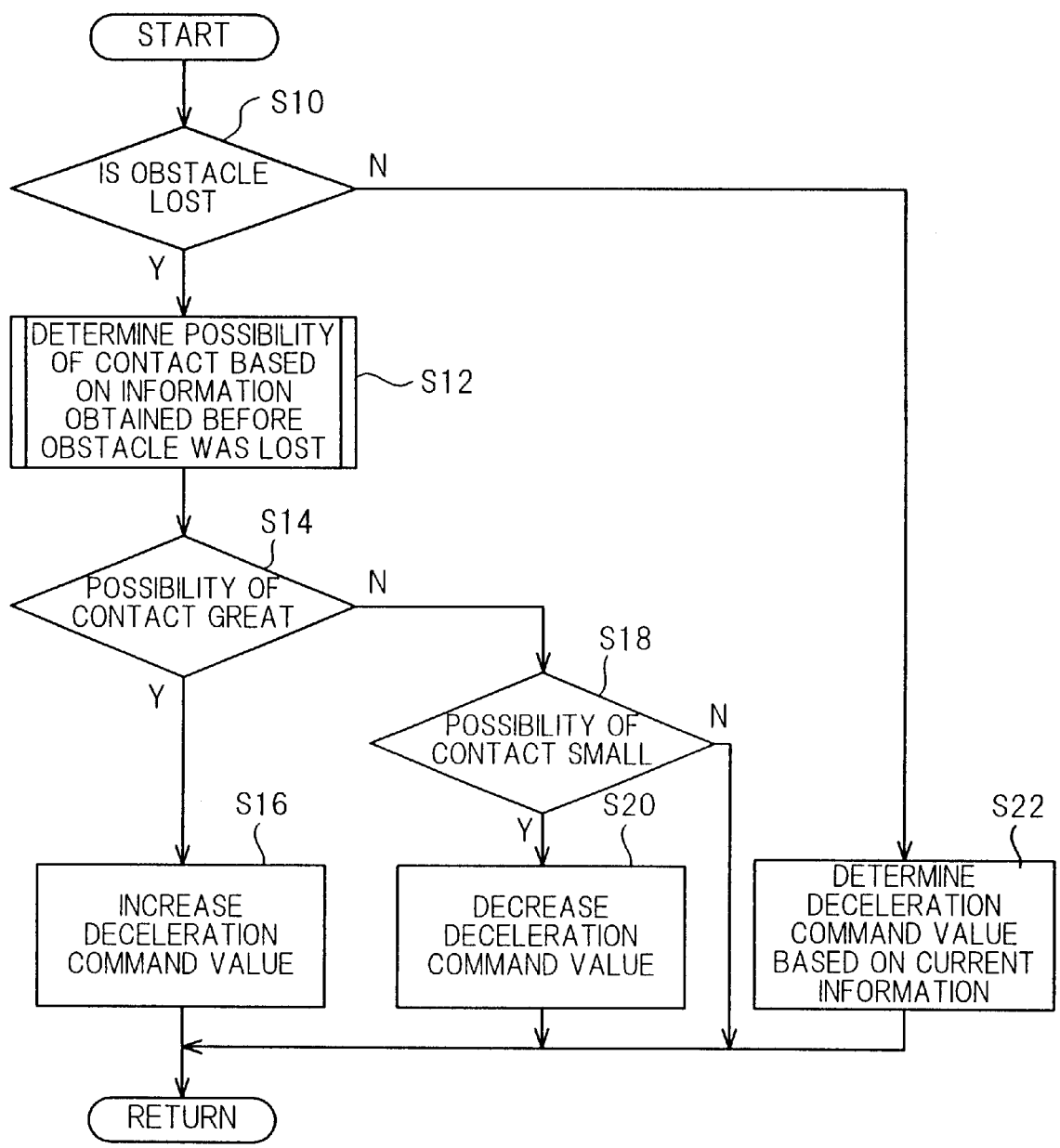
FIG. 2 is a flow chart showing the operation of the system illustrated in FIG. 1.
Figure 3:
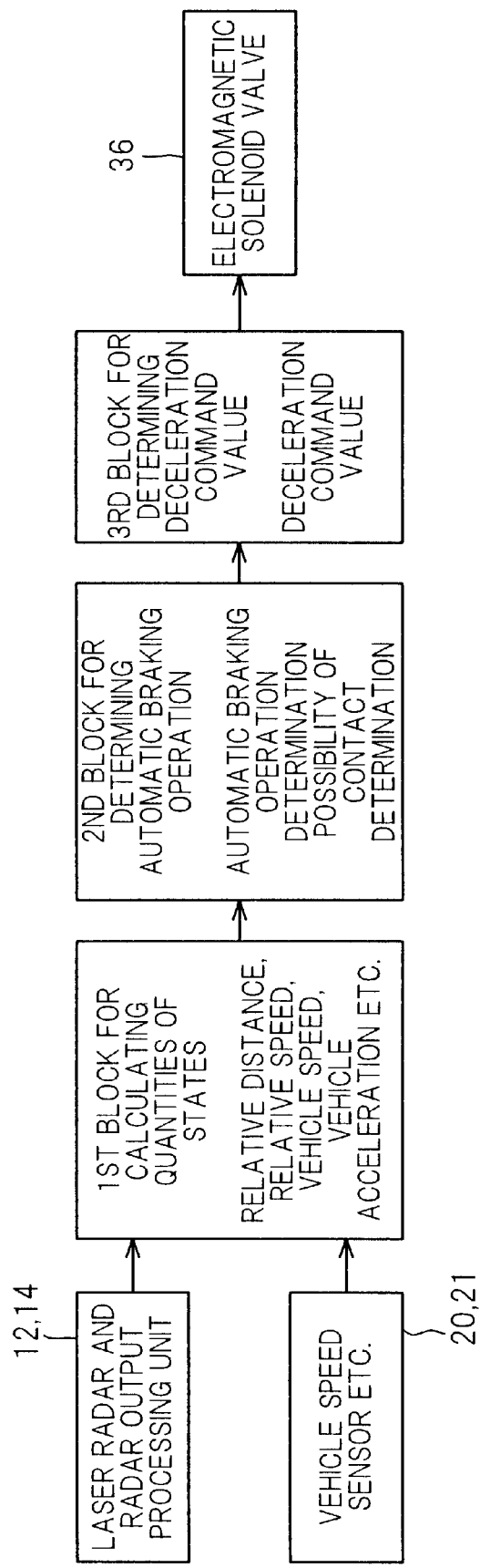
FIG. 3 is a block diagram similarly showing the operation of the system as well as the configuration of the system illustrated in FIG. 1 in a functional manner.

FIG. 2 is a flow chart showing the operation of the system, and FIG. 3 is a block diagram showing the configuration of the system in a functional manner.

Explaining the configuration of the system with reference to FIG. 3 first, the system includes a first block for calculating quantities of state, a second block for determining automatic braking operation, and a third block for calculating a deceleration command value.

The first block calculates the distance and speed of an obstacle (object such as other vehicle running ahead of the subject vehicle 10) relative to the subject vehicle 10, the speed (traveling speed) and acceleration (vehicle acceleration) of the subject vehicle 10, etc., based on the detected data obtained by the laser radar 12 (more precisely the radar output processing unit 14) and the other sensors such as the vehicle speed sensor 20. It should be noted that in this specification the term "acceleration" may be used to indicate both acceleration and deceleration.

The second block determines the possibility of contact with the obstacle based on the quantities of states calculated by the first block and determines whether the automatic braking operation should be conducted. The third block calculates a deceleration command value based on the determination of the second block and calculates a command value to be supplied to the electromagnetic solenoid valve 36.

More specifically, the second and third blocks determine a threshold value in terms of the relative distance for avoiding contact by steering and that for avoiding contact by braking, based on the calculated quantities of states, i.e., the relative distance and relative speed (between the obstacle and the subject vehicle 10), the speed and acceleration of the subject vehicle 10, etc.

The control will be explained taking as an example a situation in which the relative speed is relatively low and the relative distance for avoiding contact by steering is greater than that for avoiding contact by braking.

If the calculated (detected) relative distance is not more than the threshold value (relative distance) for avoiding contact by steering, but is not less than the threshold value (relative distance) for avoiding contact by braking, the braking system 22 is operated through the electromagnetic solenoid valve 36 to automatically brake the vehicle 10 and, if desired, the alarm system 40 is operated to alert the vehicle driver. Since it is perceived in this situation that the contact can be avoided by braking, the deceleration command value is determined to be small.

Then, if the calculated (detected) relative distance is not more than the threshold value (relative distance) for avoiding contact by braking, the deceleration command value is determined to be greater such that the vehicle is slowed at a greater deceleration. The alarm system 40 is operated first and the braking system 22 is then operated.

Thus, the third block calculates the deceleration command value based on the determination of the second block, calculates the deceleration command value and the specific command value (the duty-ratio signal) based on the deceleration command value and outputs to the electromagnetic solenoid valve 36 through a driver circuit (not shown) to operate the same.

The second block determines the possibility of contact with the obstacle, when the obstacle, once detected, is lost during automatic braking operation, based on the information obtained up to the time when the obstacle was lost. The third block corrects the deceleration command value based on the determined possibility of contact with the obstacle. These will be explained later.

Next, the operation of the system will be explained with reference to the flow chart of FIG. 2. The program shown is based on the situation wherein the obstacle, once detected, is lost when the automatic braking by the braking system 22 has been operated in response to the obstacle detection. The program is executed, for example, once every 100 milliseconds.

The program begins in S10 in which it is determined whether the obstacle is lost. When the result is affirmative, the program proceeds to S12 in which the possibility of contact with the obstacle is determined based on the information obtained up to the time when the obstacle was lost.

Figure 4:
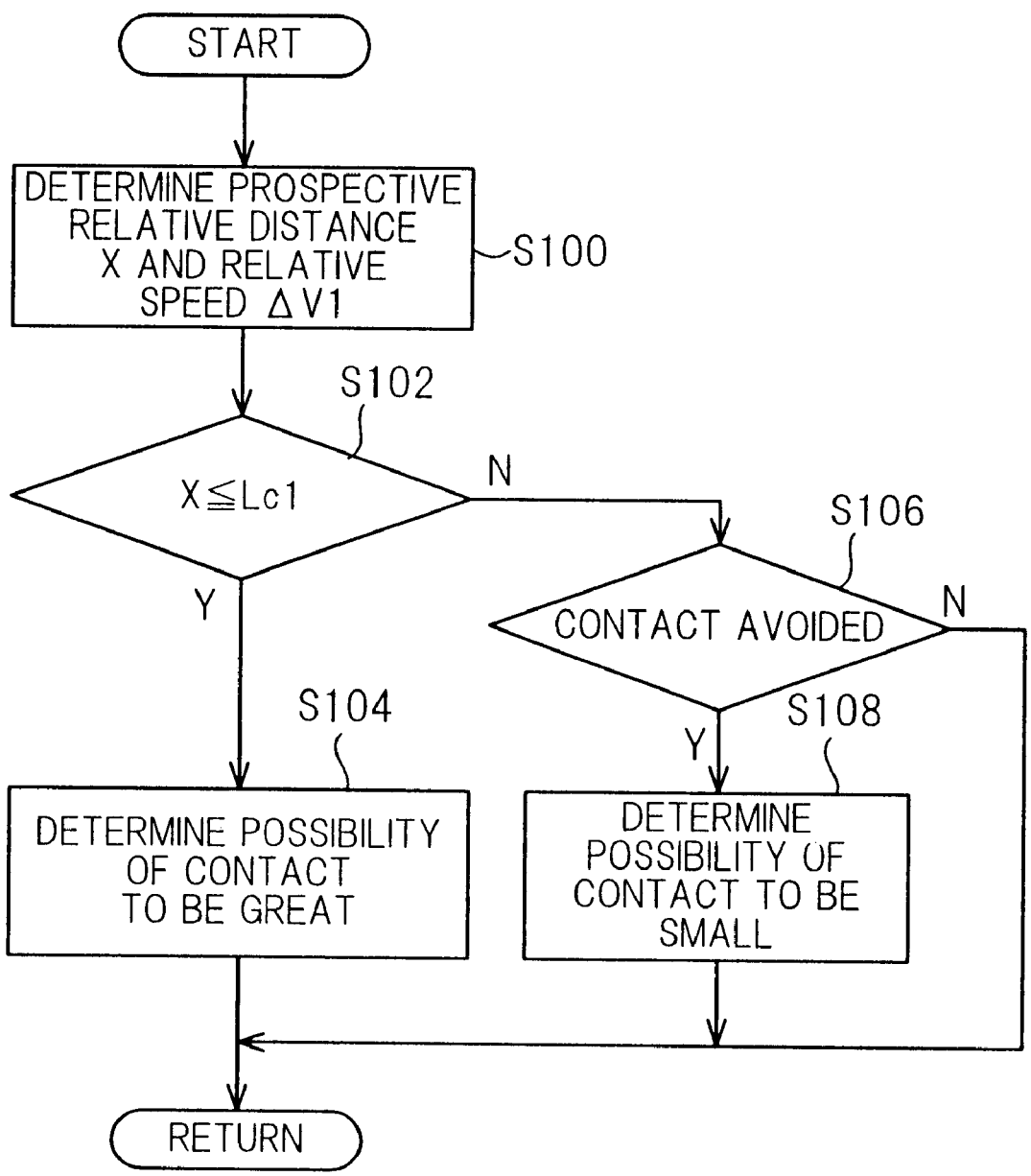
FIG. 4 is a flow chart showing the subroutine of the contact possibility determination referred to in the flow chart of FIG. 2.

FIG. 4 is a subroutine flow chart showing the determination of the contact possibility.

As will be explained below, the contact possibility is determined by predicting or estimating a prospective relative distance, etc. Specifically, when it is predicted that the relative distance will decrease in future, it can be anticipated that the contact possibility will increase in future. Accordingly, a relative distance reference value (named "Lc1"; for example, 0 meters or thereabout) is set as a reference value for predicting a future contact possibility. Also, a prospective relative distance is predicted and, if it is not more than the reference value Lc1, it is determined that the contact possibility is great.

The program begins in S100 in which the prospective relative distance X which would presumably result or occur in future, and the relative speed $\Delta V1$ are predicted.

This will be explained. Defining the obstacle (vehicle) speed at the time when it was detected as V0, the obstacle acceleration at that time as a0, the relative distance between the subject vehicle and the obstacle at that time as X0, and the elapsed time up to the current time (present) since the time of detection as t, the current relative distance X1 and the current obstacle speed V1 can be estimated or calculated as follows;

$$X1 = X0 + (V \cdot 0t + \tfrac{1}{2} \cdot a0 \cdot t^2) - \int V dt$$

$$V1 = V0 + a0 \cdot t$$

In the above, V means the subject vehicle speed and it is assumed that the subject vehicle runs at a constant deceleration.

From the above, the current relative speed $\Delta V1$ (between the subject vehicle and the obstacle) can be predicted as follows.

$$\Delta V = V - V1$$

Therefore, the prospective relative distance X (at a time T after the current time) can be expressed as Eq. 1.

$$X = X1 + (V1 \cdot T + \tfrac{1}{2} \cdot a0 \cdot T^2) - (V \cdot T + \tfrac{1}{2} \cdot a \cdot T^2) = X1 - \Delta V1 \cdot T - \tfrac{1}{2} \cdot (a - a0) \cdot T^2 \qquad \text{Eq. 1}$$

Here, a means the subject vehicle acceleration (deceleration) as mentioned above.

The condition that the prospective relative distance X becomes not more than the reference value Lc1 in future (i.e., T>0), will accordingly be one from among the following. In other words, if one among from 1) to 3) is satisfied, it can be predicted that $X \leq Lc1$.

1) $a - a0 > 0$
2) $a - a0 = 0$ and $\Delta V1 > 0$
3) $a - a0 < 0$ and $\Delta V1 > 0$ and $X1 + \tfrac{1}{2} \Delta V1^2/(a - a0) \leq Lc1$ To be more specific, when Eq. 1 is differentiated, the differential of X (expressed as X dot) will be as follows.

$X \text{ dot} = -\Delta V1 - (a-a0) \cdot T = 0$

This can be rewritten as follows.

$T = \Delta V1/-(a-a0) = -\Delta V1/(a-a0)$

Since $T \geq 0$, this can be rewritten as follows.

$T = -\Delta V1/(a-a0) \geq 0$

Here, assuming that $a-a0 < 0$ results that $\Delta V1 > 0$, therefore $a-a0 < 0$ and $\Delta V1 > 0$.

Moreover, since X at this time is not more than Lc1, Eq. 1 can be rewritten as follows.

Figure 5:
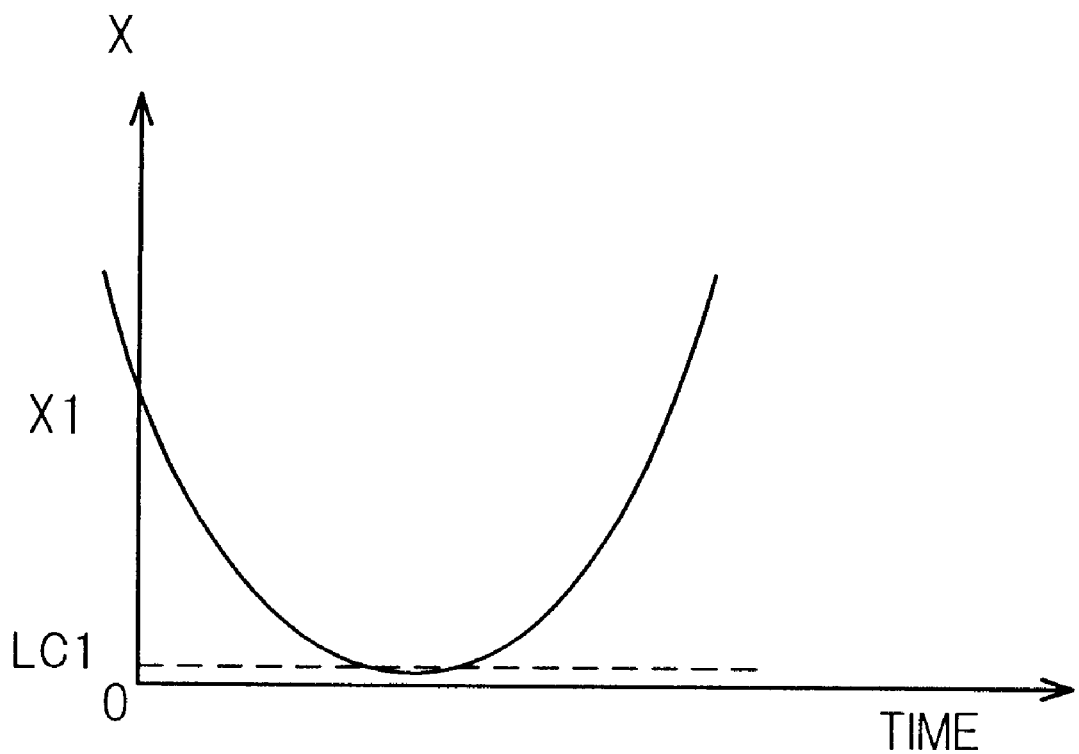
FIG. 5 is an explanatory graph showing the operation referred to in the flow chart of FIG. 4.

$X = X1 - \Delta V1 \cdot T - \frac{1}{2}(a-a0) \cdot T^2 = X1 - \Delta V1 \cdot \{-\Delta V1/(a-a0)\} - \frac{1}{2} \cdot (a-a0) \cdot \{-\Delta V1^2/(a-a0)\}^2 = X1 + \{\Delta V1^2/(a-a0)\}^2 - \frac{1}{2} \cdot \{-\Delta V1^2/(a-a0)^2\} = X1 + \frac{1}{2} \cdot \{-\Delta V1^2/(a-a0)\} \leq Lc1$ As illustrated in FIG. 5, if condition 3) is satisfied, $X \leq Lc1$.

Returning to the explanation of FIG. 4, the program proceeds to S102 in which it is determined whether the prospective relative distance X is not more than the reference value Lc1, in other words, it is determined whether any condition from among 1) to 3) is satisfied. When the result is affirmative, the program proceeds to S104 in which it is determined that the possibility of contact with the obstacle is great.

On the other hand, when the result in S102 is negative, the program proceeds to S106 in which it is determined whether the contact has been avoided based on the relative distance and relative speed at the time immediately before the obstacle was lost and the current deceleration (acceleration) of the subject vehicle.

When the result is affirmative, the program proceeds to S108 in which it is determined that the possibility of contact with the obstacle is small, while skipping S108 if the result is negative.

Returning to the explanation of FIG. 2, the program proceeds to S14 in which it is determined whether the possibility of contact, thus obtained, is great, and if the result is affirmative, to S16 in which the deceleration command value increased by addition of a predetermined unit amount to increase the vehicle deceleration.

On the other hand, when the result in S14 is negative, the program proceeds to S18 in which it is determined whether the possibility of contact is small, and if the result is affirmative, to S20 in which the predetermined unit amount is subtracted from the deceleration command value to decrease the vehicle deceleration.

The predetermined unit amount is, for example, a value corresponding to 0.5 G/sec. (G: a value corresponding to the acceleration of gravity). The predetermined unit amount used in S16 and S20 may be different, or the amount may be variable depending upon the situation.

When the result in S18 is negative, the program skips S20 to hold or keep the current deceleration command value. When the result in S10 is negative, the program proceeds to S22 in which the deceleration command value is determined based on the quantities of state of the subject vehicle and the obstacle.

In this embodiment, since the deceleration command value is corrected based on the possibility of contact with the obstacle, if the obstacle is lost during the automatic braking operation, the system can appropriately cope with a situation in which an obstacle, once detected, is lost during automatic braking operation, without degrading the driving feeling or comfort and without causing the vehicle driver to experience annoyance, while ensuring obstacle avoidance without fail.

Moreover, since the deceleration command value is not changed indiscriminately or at random, the system can cope with the situation such that the driving feeling or comfort is prevented from being degraded, and the vehicle driver is not caused to experience annoyance. Furthermore, since the deceleration command value is changed by the unit amount, the vehicle driver's maneuver will not be affected by the vehicle deceleration change.

Figure 6:
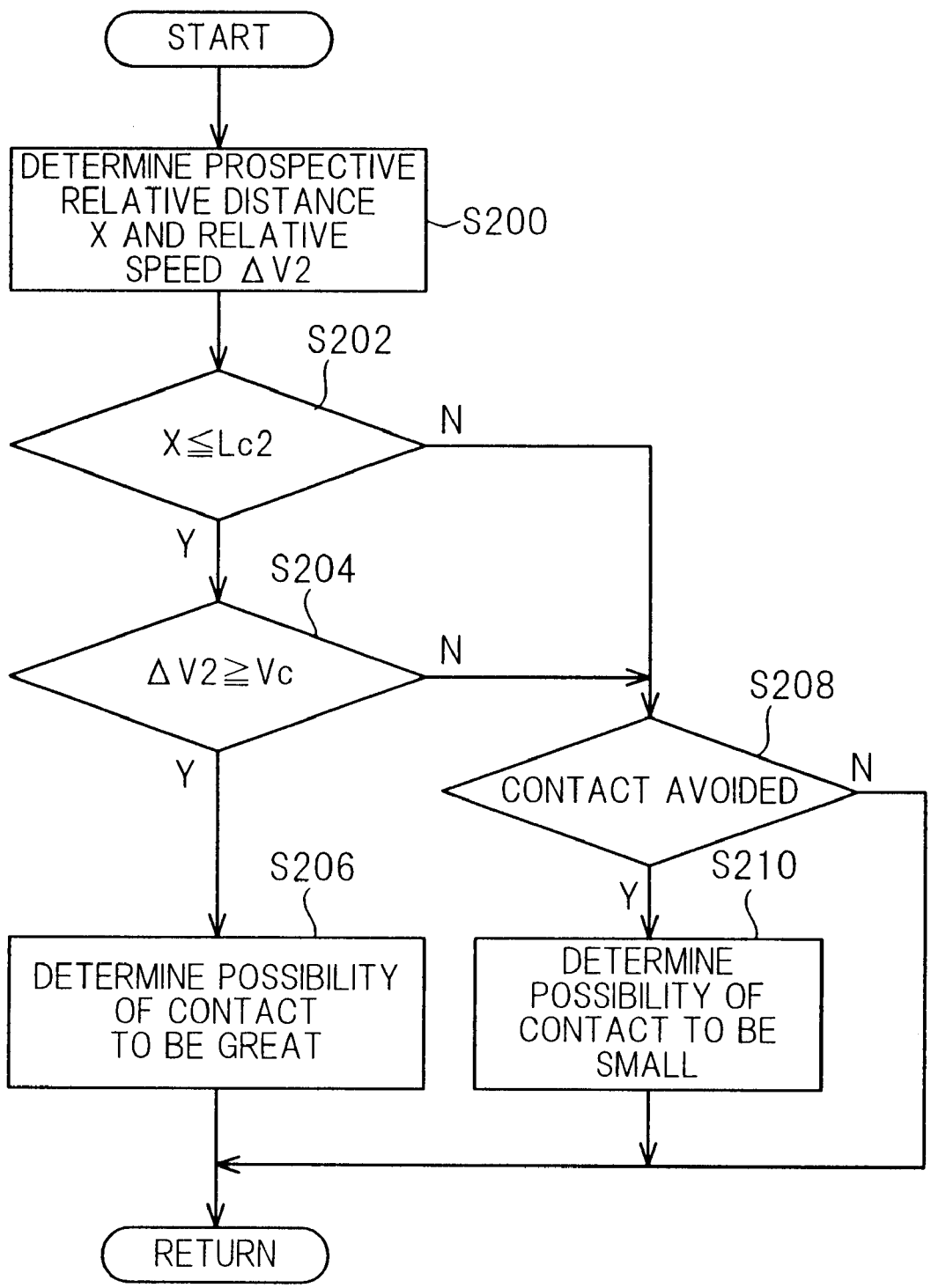
FIG. 6 is a flow chart, similar to FIG. 4, but showing the operation of the system according to a second embodiment of the invention.

FIG. 6 is a subroutine flow chart, similar to FIG. 4, but showing the operation of the system according to a second embodiment of the invention.

In the second embodiment, the prospective relative distance, etc., are predicted similarly to the first embodiment, and is configured such that the possibility of contact is great when the prospective relative distance is small, but the relative speed at that time is great.

The program begins in S200 in which the prospective relative distance X and a prospective relative speed $\Delta V2$ are predicted, and proceeds to S202 where it is determined whether the prospective relative distance is not more than a reference value (expressed as "Lc2", being a value similar to that of the first embodiment). When the result is affirmative, the program proceeds to S204 in which it is determined that the prospective relative distance $\Delta V2$ is not less than a reference value Vc.

When the result in S204 is affirmative, the program proceeds to S206 in which it is determined that the possibility of contact is great. On the other hand, when the result in S202 or S204 is negative, the program proceeds to S208 in which it is determined whether the contact has been avoided. When the result is affirmative, the program proceeds to S210 in which it is determined that the possibility of contact is small, while skipping S210 when the result is negative.

In the second embodiment, thus, the relative distance reference value Lc2 (e.g., 0 meter) and the relative speed reference value Vc (e.g., 20 km/h) are predetermined and, based thereon, the possibility of contact is determined.

The condition that the prospective relative distance X is not more than the reference value Lc2 will be one from among 1) to 3) mentioned in the first embodiment.

Time T2 (a time until X becomes not more than Lc2) can be obtained as follows.

$T2 = \{(\Delta V1^2 + 2 \cdot (a-a0) \cdot (X1-Lc2))^{1/2} - \Delta V1\}/(a-a0)$ The above is the case in which $a0-a \neq 0$. If $a0-a = 0$, the time T2 will be expressed as follows.

$T2 = (X1-Lc2)/\Delta V1$ therefore, the prospective relative speed $\Delta V2$ can be obtained as follows. In the below, $\Delta V1$ means the current relative speed.

$\Delta V2 = \Delta V1 + (a-a0) \cdot T2$

Thus, if any condition among from 1) to 3) is satisfied and if $\Delta V2 \geq Vc$, the prospective relative distance X is not more than the reference value Lc2 and the prospective relative speed $\Delta V2$ at that time is not less than Vc, it can be determined that the possibility of contact with the obstacle is great. The rest of the second embodiment is the same as the first embodiment.

Having been configured in the foregoing manner, the contact possibility determination in the second embodiment can accordingly be conducted more accurately than that in the first embodiment, thereby enabling the system to cope more appropriately with a situation in which an obstacle, once detected, is lost during automatic braking operation, without degrading the driving feeling or comfort and without causing the vehicle driver to experience annoyance, while ensuring obstacle avoidance without fail.

Figure 7:
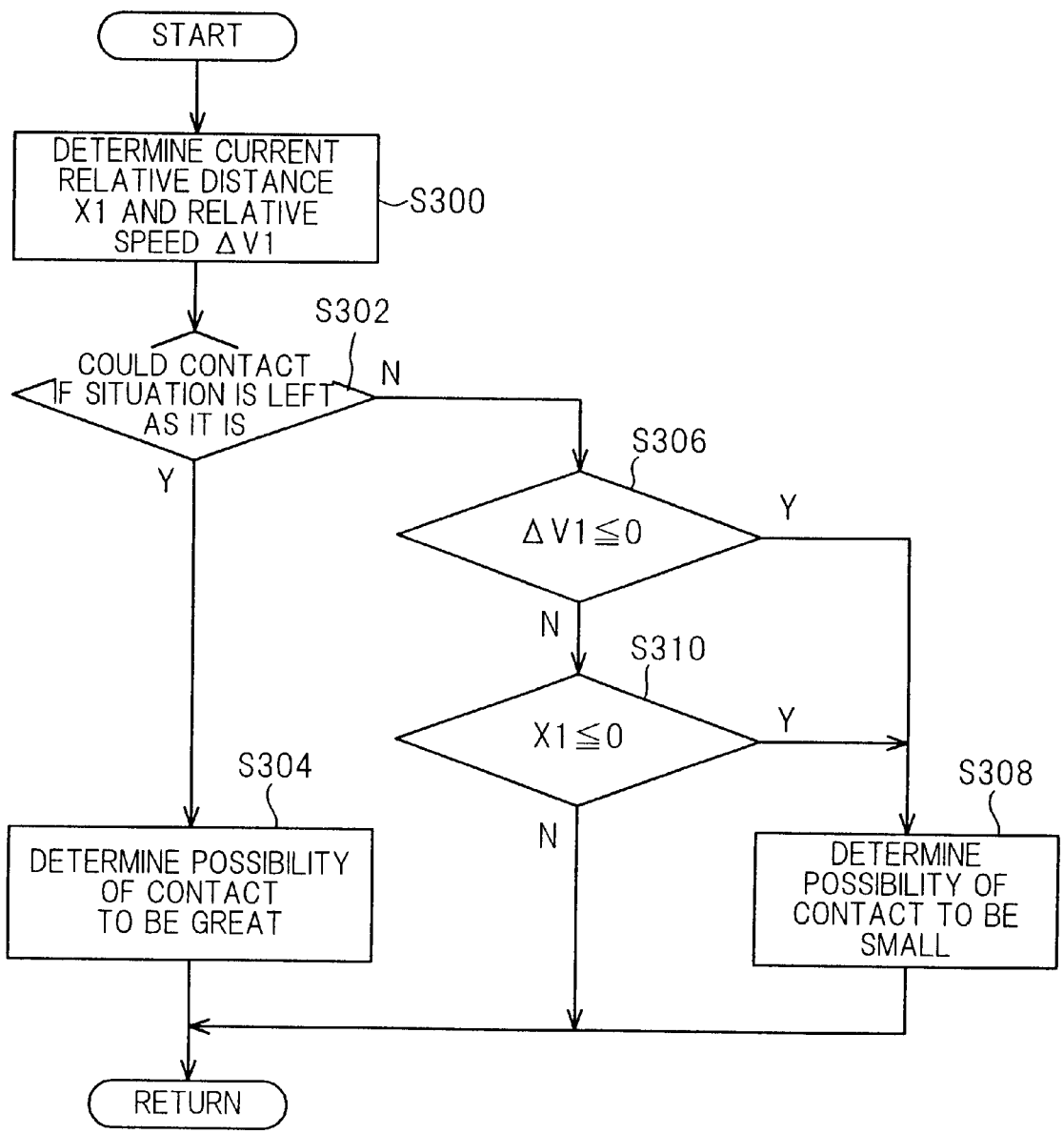
FIG. 7 is a flow chart, similar to FIG. 4, but showing the operation of the system according to a third embodiment of the invention.

FIG. 7 is a subroutine flow chart, similar to FIG. 4, but showing the operation of the system according to a third embodiment of the invention.

The third embodiment concerns to a case where the possibility of contact is determined to be small.

The program begins in S300 in which the current relative distance X1 and the current relative speed ΔV1 are obtained, and proceeds to S302 where it is determined based on the determined parameters whether the subject vehicle could come into contact with the obstacle if the situation is left as it is.

When the result is affirmative, the program proceeds to S304 in which it is determined that the possibility of contact is great. On the other hand, if the result in S302 is negative, the program proceeds to S306 in which it is determined whether the determined relative speed ΔV1 is not more than zero. If the result is affirmative, since this means that the contact has been avoided, the program proceeds to S308 in which it is determined that the contact possibility is small.

When the result in S306 is negative, the program proceeds to S310 in which it is determined whether the determined relative distance X1 is not more than zero, and if the result is affirmative, since this also means that the contact has been avoided, the program proceeds to S308. The rest of the third embodiment is the same as the first embodiment.

Having been configured in the foregoing manner, the contact possibility determination in the third embodiment, in particular in the determination that the possibility of contact is small, can accordingly be conducted more accurately than that in the foregoing embodiments, thereby enabling the system to cope more appropriately with a situation in which an obstacle, once detected, is lost during automatic braking operation, without degrading the driving feeling or comfort and without causing the vehicle driver to experience annoyance, while ensuring obstacle avoidance without fail.

Figure 8:
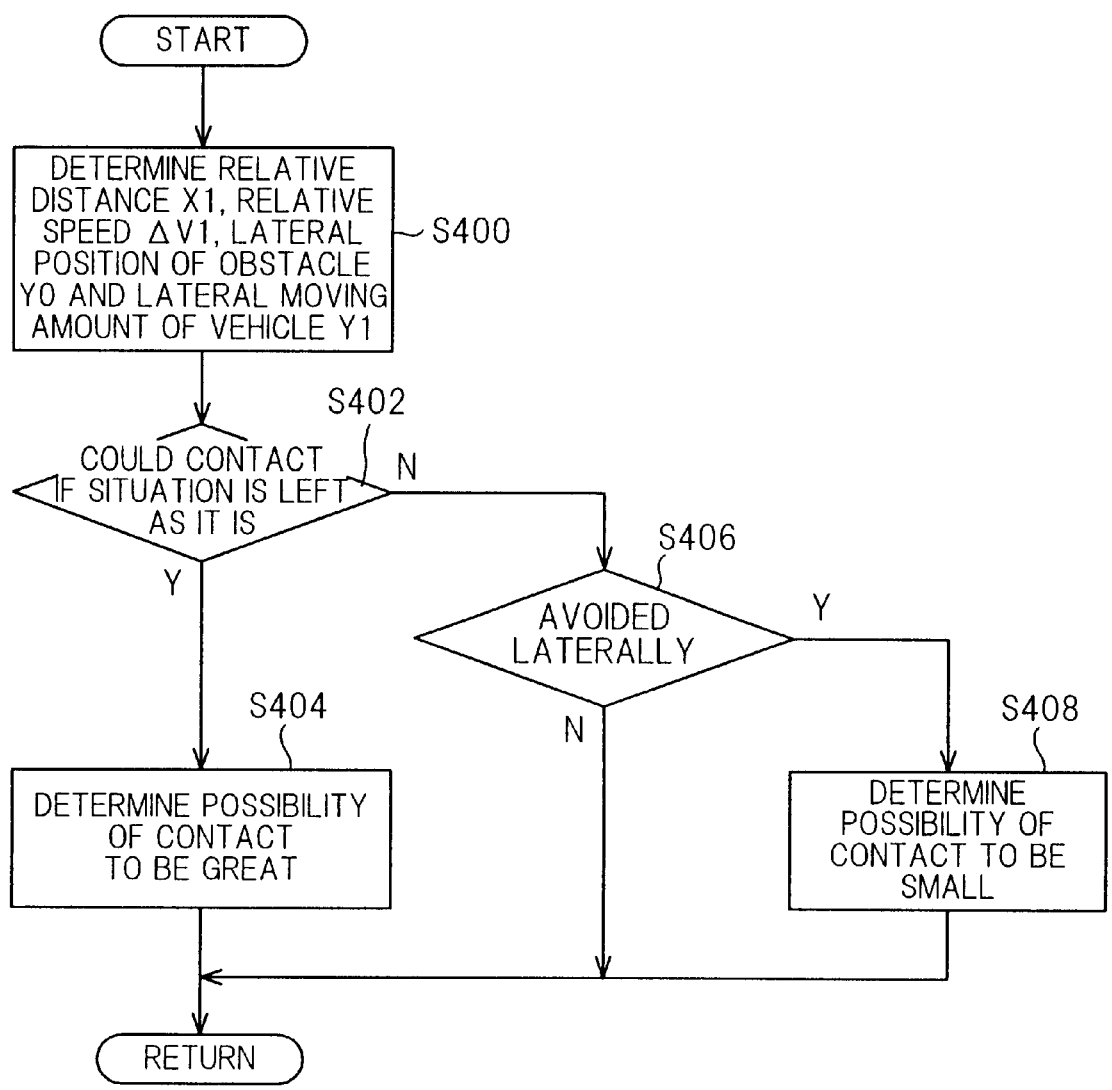
FIG. 8 is a flow chart, similar to FIG. 4, but showing the operation of the system according to a fourth embodiment of the invention.

FIG. 8 is a subroutine flow chart, similar to FIG. 4, but showing the operation of the system according to a fourth embodiment of the invention.

Similarly to the third embodiment, the fourth embodiment concerns to a case where the contact possibility is determined to be small.

The program begins in S400 in which the current relative distance X1, the current relative speed ΔV1, a position of the obstacle in the lateral direction Y0 and a moving amount of the subject vehicle in the same direction Y1 are determined or estimated. The "lateral direction" means the vehicle-width direction as expressed in FIG. 9 by Y, etc.

The program proceeds to S402 in which it is determined based on the determined parameters whether the subject vehicle could come into contact with the obstacle if the situation is left as it is. When the result is affirmative, the program proceeds to S404 in which it is determined that the contact possibility is great.

On the other hand, if the result in S402 is negative, the program proceeds to S406 in which it is determined whether the subject vehicle has avoided the obstacle in the lateral direction (vehicle-width direction).

Figure 9:
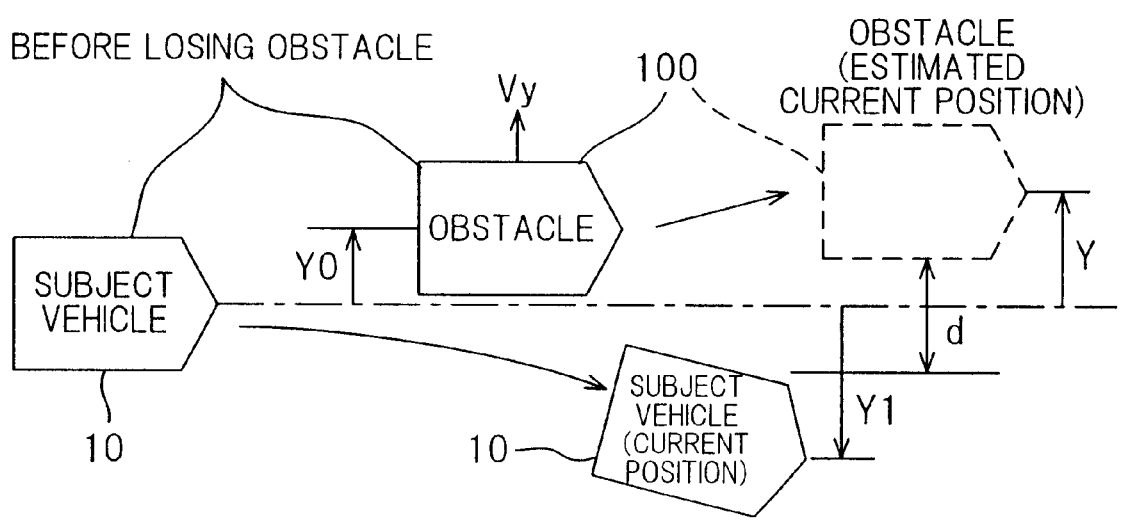
FIG. 9 is an explanatory view showing the operation referred to in the flow chart of FIG. 8.

This will be explained with reference to FIG. 9. Defining the position of the obstacle 100 (before being lost) in the lateral direction as Y0, the obstacle speed in the lateral direction as Vy, and a time up to the current time (present) since the obstacle was lost as t, a moving amount of the obstacle in the lateral direction Y within the time t and the moving amount of the subject vehicle 10 in the same direction Y1 can be estimated or determined as follows.

$$Y = Y0 + Vy \cdot t$$

$$Y = \int \{V \sin(\int \omega dt)\} dt$$

In the above, ω indicates the yaw rate of the subject vehicle 10.

The width (length in the lateral direction) of the obstacle is obtained from the output of the radar output processing unit 14, or may be assumed to be a predetermined value (such as 2 meters). The distance in the lateral direction d between the subject vehicle 10 and the obstacle 100 will be calculated as follows.

$$d = |Y - Y1| - (\text{obstacle width} + \text{subject vehicle width})/2$$

Accordingly, by calculating the lateral distance d in S406 and by determining whether d is not more than 0, it can be determined whether the subject vehicle 10 has avoided the obstacle 100 in the lateral direction.

Returning to the explanation of FIG. 8, when the result in S406 is affirmative, since this means that the subject vehicle has avoided the obstacle in the lateral direction, the program proceeds to S408 in which it is determined that the contact possibility is small, while skipping S408 when the result is negative. The rest of the fourth embodiment is the same as the first embodiment.

Having been configured in the foregoing manner, the fourth embodiment has the same effect and advantages of the third embodiment, thereby enabling the system to cope more appropriately with a situation in which an obstacle, once detected, is lost during automatic braking operation, without degrading the driving feeling or comfort and without causing the vehicle driver to experience annoyance, while ensuring obstacle avoidance without fail.

Moreover, the contact possibility decrease can be determined more properly in the fourth embodiment, thereby preventing the vehicle deceleration from being continued unnecessarily.

Figure 10:
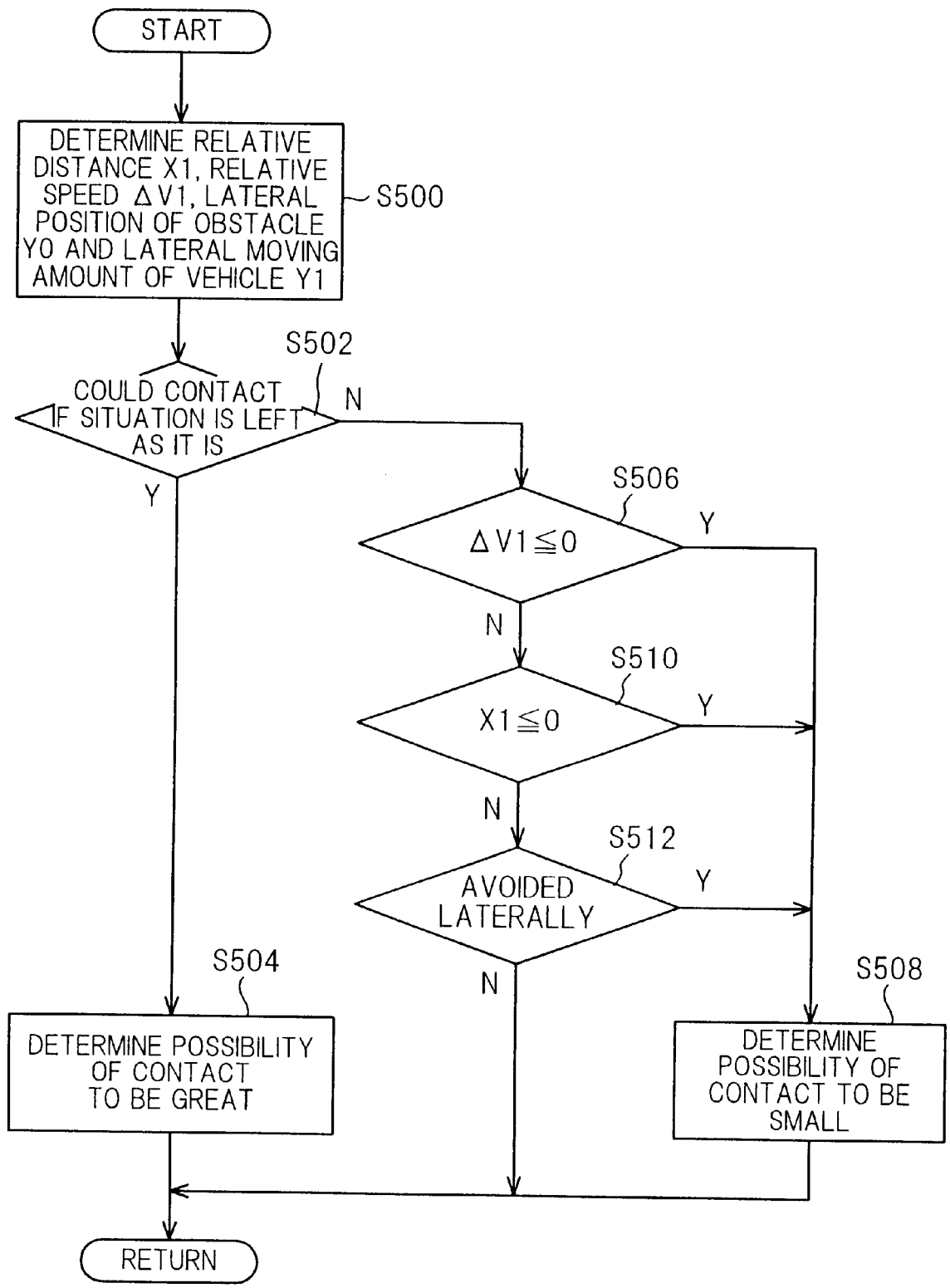
FIG. 10 is a flow chart, similar to FIG. 2, but showing the operation of the system according to a fifth embodiment of the invention.

FIG. 10 is a subroutine flow chart, similar to FIG. 4, but showing the operation of the system according to a fifth embodiment of the invention.

The fifth embodiment is a combination of the third and fourth embodiments.

The program begins in S500 in which the current relative distance X1, the current relative speed ΔV1, the position of the obstacle in the lateral direction Y0 and the moving amount of the subject vehicle in the same direction Y1 are determined or estimated.

The program proceeds to S502 in which it is determined based on the determined parameters whether the subject vehicle could come into contact with the obstacle if the situation is left as it is. When the result is affirmative, the program proceeds to S504 in which it is determined that the contact possibility is great.

On the other hand, if the result in S502 is negative, the program proceeds to S506 in which it is determined whether the relative speed ΔV1 is not more than 0. When the result is affirmative, since this means that the contact has been avoided, the program proceeds to S508 in which it is determined that the contact possibility is small.

When the result in S506 is negative, the program proceeds to S510 in which it is determined whether the calculated relative distance X1 is not more than 0, and if the result is affirmative, since this also means that the contact has been avoided, the program proceeds to S508.

When the result in S510 is negative, the program proceeds to S512 in which the subject vehicle has avoided the obstacle in the lateral direction (vehicle-width direction). When the result in S512 is affirmative, since this means that the subject vehicle has avoided the obstacle in the lateral direction, the program proceeds to S508 in which it is determined that the possibility of contact is small, while skipping S508 when the result is negative. The rest of the fourth embodiment is the same as the foregoing embodiments.

Having been configured in the foregoing manner, the fifth embodiment has the same effect and advantages of the third and fourth embodiments, thereby enabling the system to cope more appropriately with a situation in which an obstacle, once detected, is lost during automatic braking operation, without degrading the driving feeling or comfort and without causing the vehicle driver to experience annoyance, while ensuring obstacle avoidance without fail.

Figure 11:
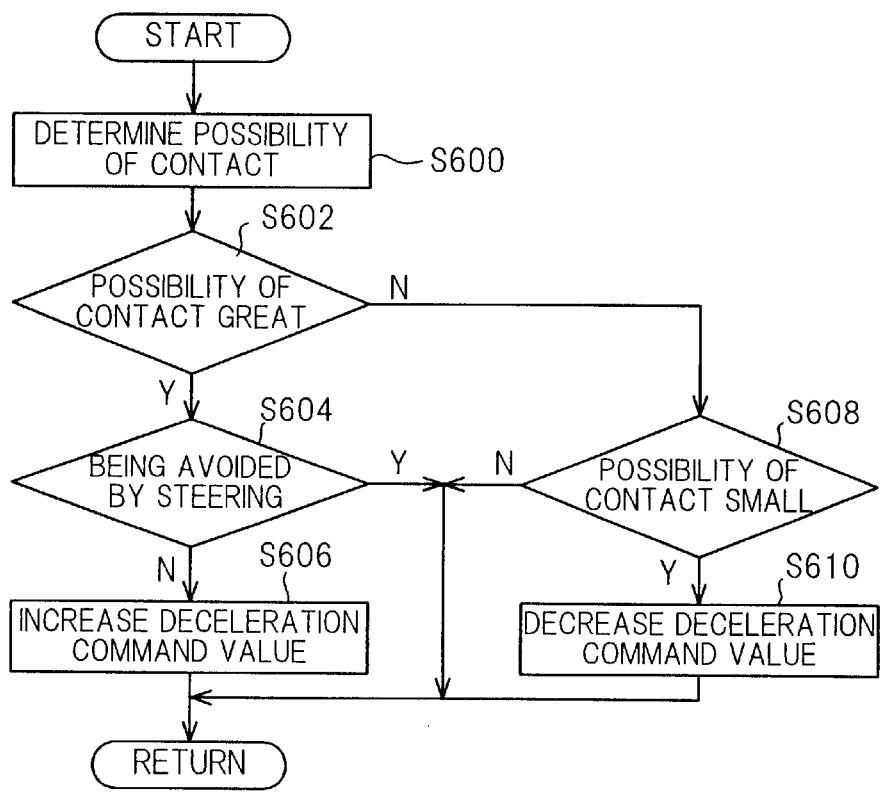
FIG. 11 is a flow chart, similar to FIG. 2, but showing the operation of the system according to a sixth embodiment of the invention.

FIG. 11 is a subroutine flow chart, similar to FIG. 2, but showing the operation of the system according to a sixth embodiment of the invention.

In the sixth embodiment, the possibility of contact is determined and then it is determined whether the vehicle driver has avoided the obstacle by steering and the deceleration command value is corrected based on the determination.

The program begins in S600 in which the possibility of contact is determined using any manner mentioned in the foregoing embodiment, and proceeds to S602 in which it is determined whether the determined possibility of contact is great. When the result is affirmative, the program proceeds to S604 in which it is determined whether the contact is being avoided (or has been avoided) by vehicle driver's steering.

Explaining this, the steer angle is determined from the output of the steer angle sensor 21. The differential (or difference) of the determined steer angle is then calculated to determine the steer angular velocity. Since the direction in which the steering wheel is moved is not significant, the steer angle and steer angular velocity are determined as an absolute value.

Figure 12:
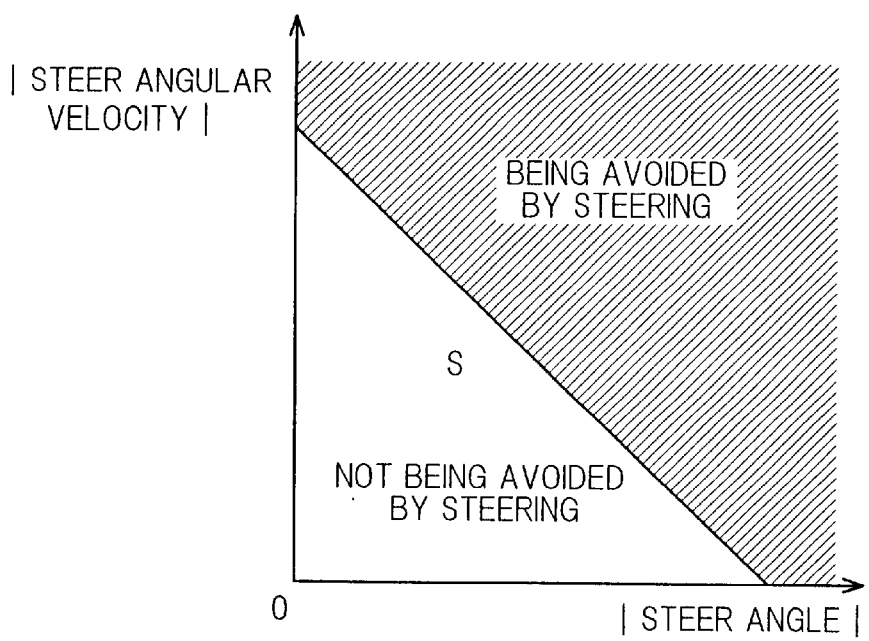
FIG. 12 is an explanatory view showing the characteristic referred to in the flow chart of FIG. 11.

If the vehicle driver steers to avoid the obstacle, it can be considered that the absolute values of the steer angle and steer angular velocity will be increased. Therefore, a characteristic shown in FIG. 12 is prepared beforehand and by comparing the calculated absolute values with a reference value (line) S (illustrated in the figure), it can be determined that the vehicle driver steers to avoid the obstacle when the calculated absolute values exceeds the reference value (line) S.

Returning to the explanation of FIG. 11, it is determined in S604 whether the contact is being avoided (or has been avoided) by steering by determining whether the calculated absolute values of the steer angle and steer angular velocity exceed the reference value (line) S. When the result is negative, the program proceeds to S606 in which the deceleration command value is added by the unit amount to increase the vehicle deceleration, since it has been determined in S602 that the possibility of contact is great.

On the other hand, when the result in S604 is affirmative, the program skips S606 to hold the current vehicle deceleration so as not to disturb the vehicle driver's contact avoidance by steering. When the result in S602 is negative, the program proceeds to S608 in which it is determined whether the possibility of contact is small, and if the result is affirmative, the program proceeds to S610 in which the unit amount is subtracted from the deceleration command value to decrease the vehicle deceleration. When the result in S608 is negative, since this means that the contact possibility is medium, the program skips S610 to hold the current deceleration command value.

Figure 13:
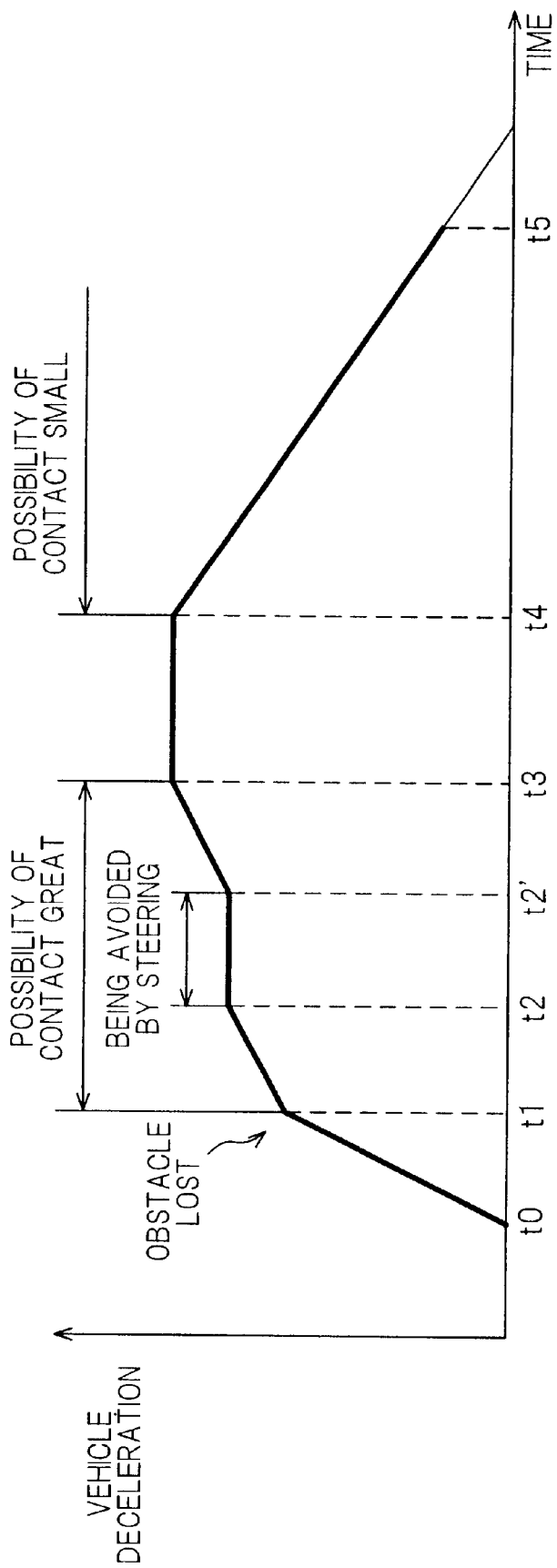
FIG. 13 is a time chart showing the operation of the system shown in FIG. 11.

FIG. 13 is a time chart showing the procedures illustrated in the flow chart of FIG. 1. Assuming that the automatic braking operation is started at time t0 and the obstacle is lost at time t1, the vehicle deceleration (corresponding to the deceleration command value) is controlled to be increased gradually with respect to time for a period during which the possibility of contact is successively determined to be great.

In the meantime, if it is presumed that the contact avoidance by steering is started at time t2, the increase of the vehicle deceleration is stopped. If it is presumed that the contact avoidance by steering is terminated at time t2', the vehicle deceleration is again increased unless the possibility of contact becomes small. If the contact possibility is determined to be not great at time t3 such that the deceleration reaches the value necessary for avoiding contact, the increase of the vehicle deceleration is again stopped.

Then, if it is presumed that the contact is avoided at time t4 due to the decrease of the relative speed, etc., the vehicle deceleration is gradually decreased and if it reaches zero, the automatic braking is terminated. As shown by dashed lines in the figure, the automatic braking may be terminated at time t5 if the vehicle deceleration becomes not more than a predetermined value such as 0.1 G, as will be referred to in an eighth embodiment of the invention.

Having been configured in the foregoing manner, the sixth embodiment has similar effects and advantages of the foregoing embodiments, thereby enabling the system to cope more appropriately with a situation in which an obstacle, once detected, is lost during automatic braking operation, without degrading the driving feeling or comfort and without causing the vehicle driver to experience annoyance, while ensuring obstacle avoidance without fail.

Moreover, when the vehicle driver intends to avoid the obstacle by steering, the control in the sixth embodiment can prevent interference with the driver's steering from happening.

Figure 14:
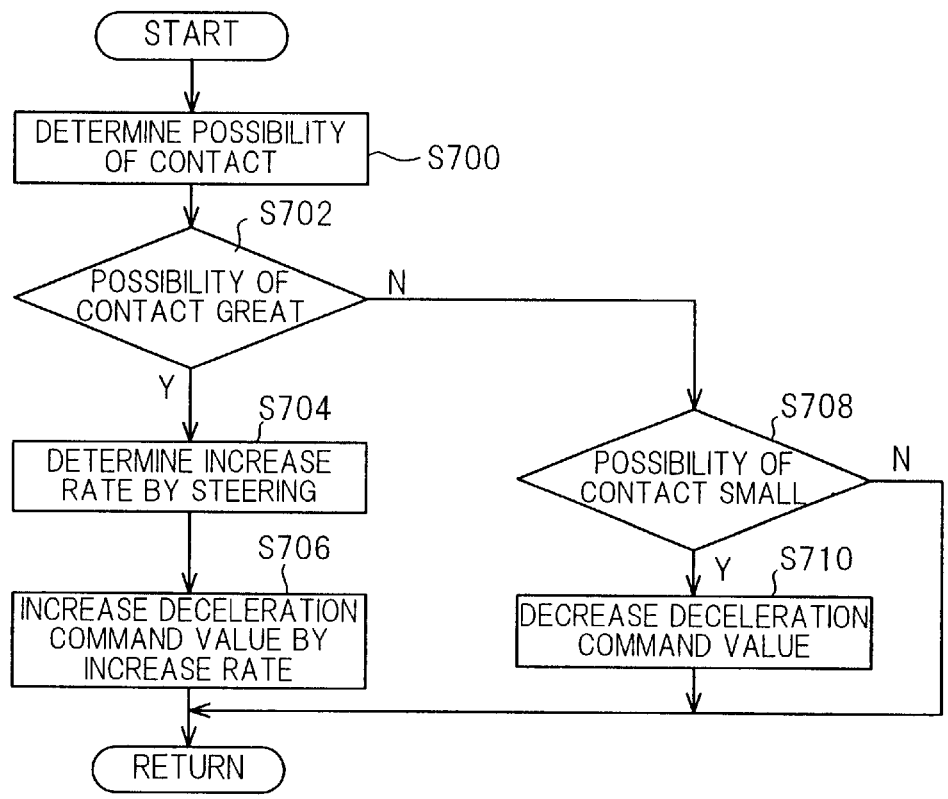
FIG. 14 is a flow chart, similar to FIG. 2, but showing the operation of the system according to a seventh embodiment of the invention.

FIG. 14 is a subroutine flow chart, similar to FIG. 2, but showing the operation of the system according to a seventh embodiment of the invention.

In the seventh embodiment, the deceleration command value is determined or corrected based on the condition of steering.

The program begins in S700 in which the possibility of contact is determined using any manner mentioned in the foregoing embodiments, and proceeds to S702 in which it is determined whether the determined possibility of contact is great. When the result is affirmative, the program proceeds to S704 in which an amount to be added to the deceleration command value is determined based on the condition of steering.

Figure 15:
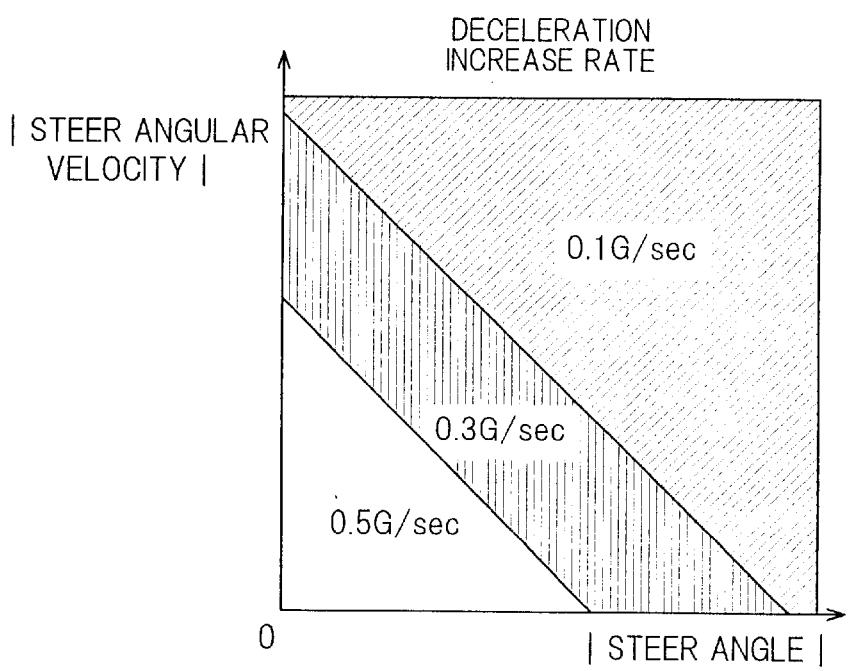
FIG. 15 is a view, similar to FIG. 12, but showing the characteristic referred to in the flow chart of FIG. 14.

Explaining this, a characteristic shown in FIG. 15 is prepared beforehand. As illustrated, the characteristic has three areas each defining the amount to be added to the deceleration command value, specifically defined in terms of rate of increase (the amount) as 0.1 G/sec., 0.3 G/sec., and 0.5 G/sec. In the seventh embodiment, one from among three areas is selected by the absolute values of the steer angle and steer angular velocity (calculated in the same manner as that in the sixth embodiment) to determine the rate (amount) defined there. The characteristic is predetermined such that the increase rate (amount) decreases with increasing absolute values of the steer angle and steer angular velocity.

Returning to the explanation of FIG. 14, the program then proceeds to S706 in which the selected rate of increase is added to the deceleration command value. On the other hand, if the result in S702 is negative, the program proceeds to S708 and on, where the same procedures as those of the sixth embodiment are conducted.

Having been configured in the foregoing manner, the seventh embodiment has similar effects and advantages of the foregoing embodiments, thereby enabling the system to cope more appropriately with a situation in which an obstacle, once detected, is lost during automatic braking operation, without degrading the driving feeling or comfort and without causing the vehicle driver to experience annoyance, while ensuring obstacle avoidance without fail.

Moreover, the control in the seventh embodiment can similarly prevent interference with the driver's steering from happening.

Furthermore, the control in the seventh embodiment can suppress the increase of the deceleration command to a necessary and least extent.

Figure 16:
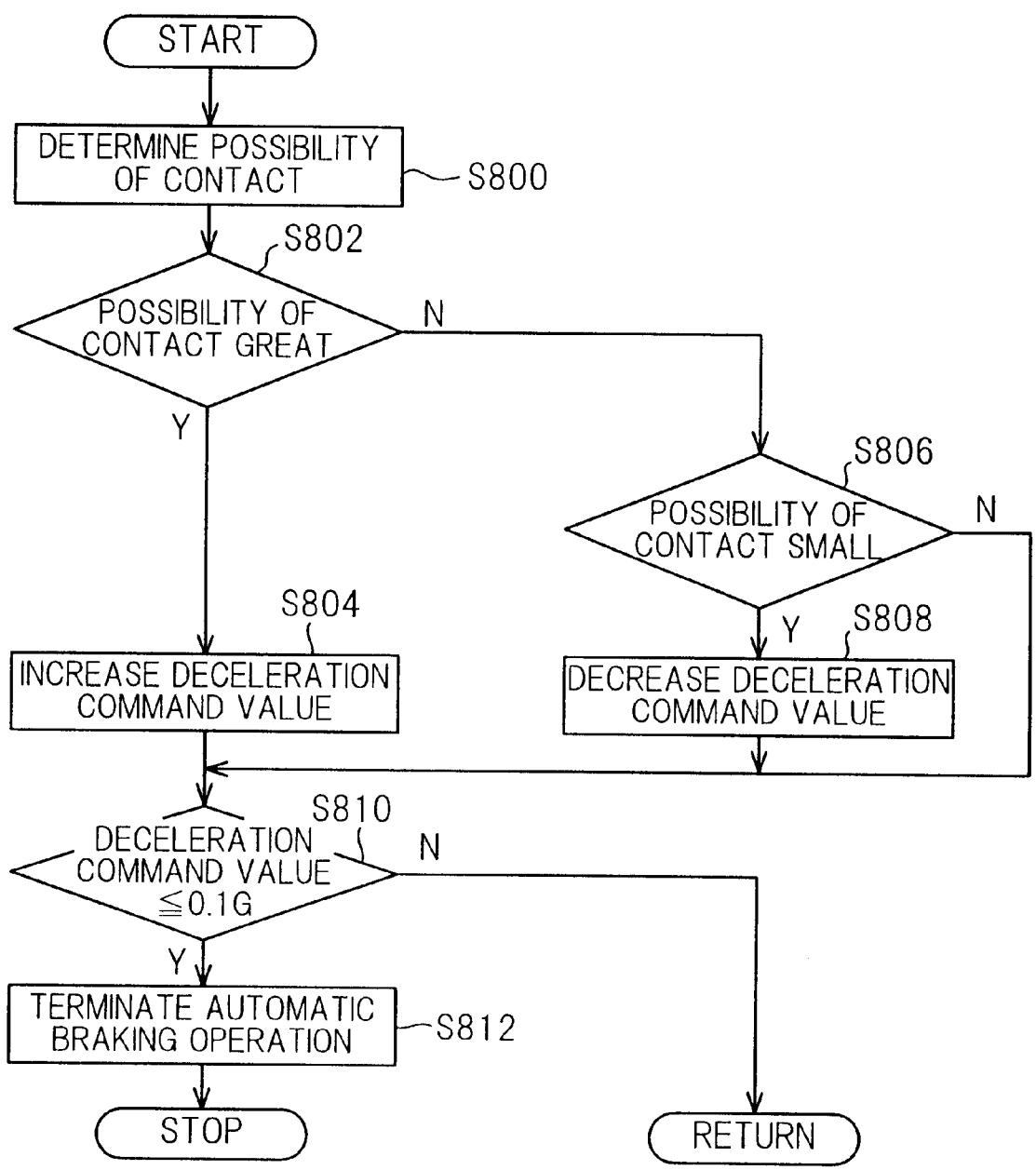
FIG. 16 is a flow chart, similar to FIG. 14, but showing the operation of the system according to an eighth embodiment of the invention.

FIG. 16 is a subroutine flow chart, similar to FIG. 14, but showing the operation of the system according to the aforesaid eighth embodiment of the invention.

The program begins in S800 and proceeds up to S808 in the same manner as in the foregoing embodiments to determine or correct the deceleration command value based on the possibility of contact.

The program then proceeds to S810 in which it is determined whether the vehicle deceleration is not more than a prescribed value (e.g., 0.1 G), and if the result is affirmative, the program proceeds to S812 in which the automatic braking operation is terminated or discontinued. If the result in S810 is negative, the program skips to S812 to continue the automatic braking operation.

Having been configured in the foregoing manner, the eighth embodiment has similar effects and advantages of the foregoing embodiments, thereby enabling the system to cope more appropriately with a situation in which an obstacle, once detected, is lost during automatic braking operation, without degrading the driving feeling or comfort and without causing the vehicle driver to experience annoyance, while ensuring obstacle avoidance without fail.

Moreover, the system according to the eighth embodiment can properly determine the time for terminating the automatic braking.

Figure 17:
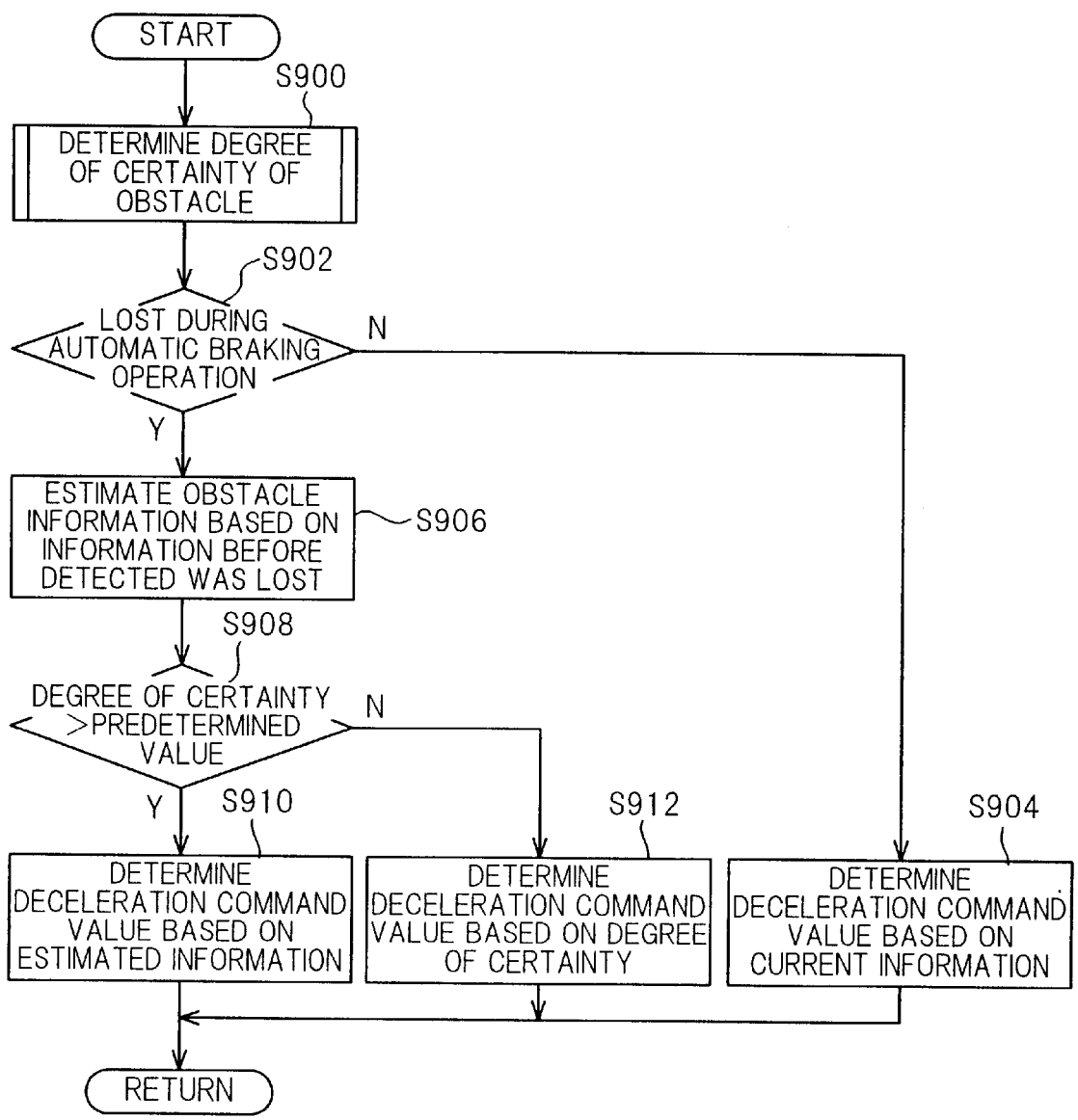
FIG. 17 is a flow chart, similar to FIG. 2, but showing the operation of the system according to a ninth embodiment of the invention.
Figure 18:
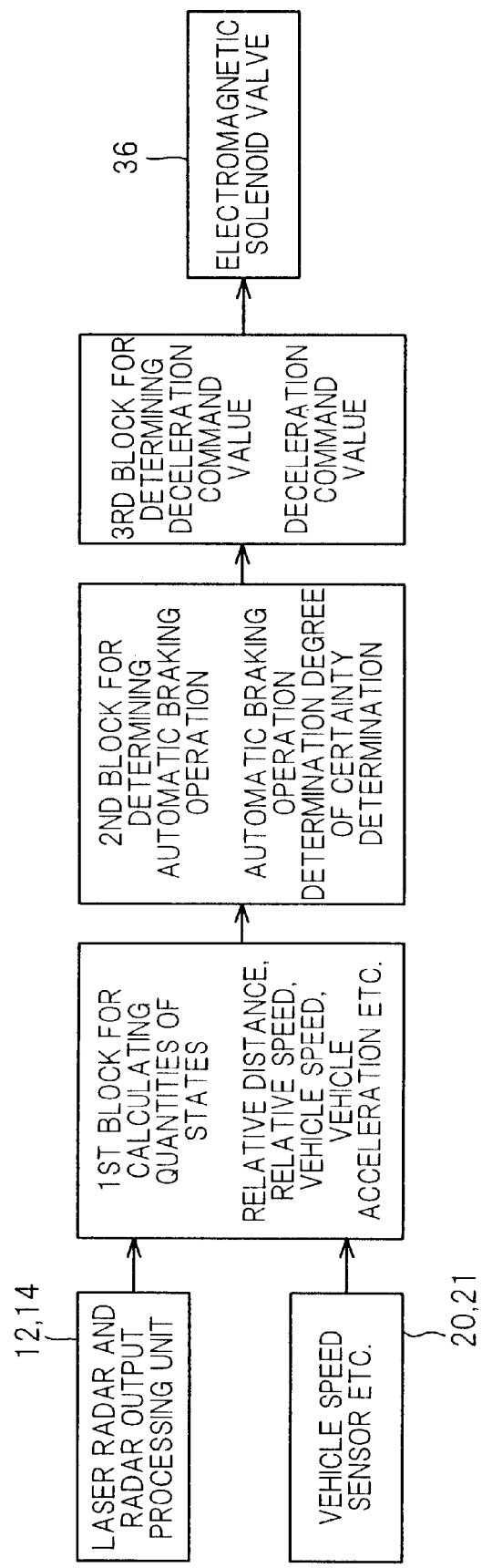
FIG. 18 is a view, similar to FIG. 3, but showing the operation and the configuration of the system illustrated in FIG. 17.

FIG. 17 is a flow chart showing the operation of the system according to a ninth embodiment of the invention, and FIG. 18 is a block diagram, similar to FIG. 3, but showing the configuration of the system in a functional manner.

Explaining the configuration of the system with reference to FIG. 18 first, the system according to the ninth embodiments includes a first block for calculating quantities of state, a second block for determining automatic braking, and a third block for calculating a deceleration command value.

The operation of the blocks are similar to those in the foregoing embodiments, except for the fact that the second block determines or calculates not only the possibility of contact with the obstacle, but also the degree of certainty of obstacle.

The phrase "the degree of certainty of obstacle" is a kind of so-called certain factor, and represents the degree to which it is believed that the detected is, in fact, an obstacle. The degree of certainty of obstacle is determined in numbers ranging from 0, indicating definite evidence that the obstacle is false, to 1, indicating definite evidence that obstacle is true.

In the ninth embodiment, thus, the system determines or calculates the degree of certainty of obstacle such that the confidence increases with increasing degree of certainty of obstacle.

Explaining the ninth embodiment with reference to the flow chart of FIG. 17, the program begins in S900 in which the degree of certainty of obstacle is determined or calculated.

Figure 19:
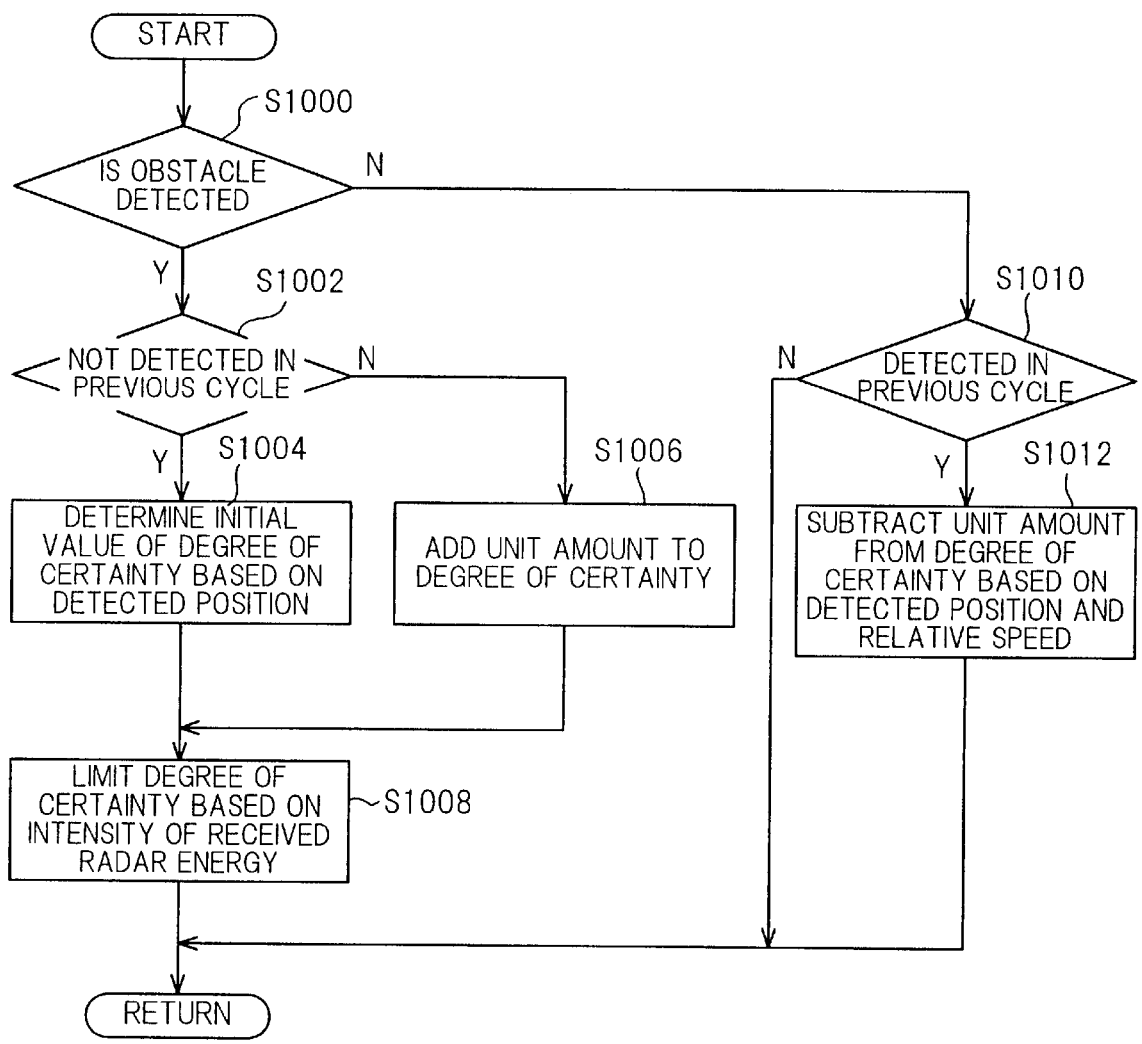
FIG. 19 is a flow chart showing the subroutine of the determination of the degree of certainty of obstacle referred to in the flow chart of FIG. 2.

FIG. 19 is a subroutine flow chart showing the determination of the degree of certainty of obstacle.

The program begins in S1000 in which it is determined whether an obstacle is detected, and if the result is affirmative, the program proceeds to S1002 in which it is determined whether the obstacle was not detected in the last program loop of FIG. 2 flow chart.

When the result is affirmative, since this means that it is for the first time that the obstacle is detected, the program proceeds to S1004 in which the initial value of the degree of certainty of obstacle is determined based on the detected position of the obstacle in the detection range of the laser radar 12.

The obstacle normally appears first at the end (more specifically at the distal (corresponding to the farthest position) end or at the left or right end) of the radar detection range. Accordingly, if the first detected position (in the radar detection range) at which the obstacle is detected for the first time is at or close to the distal end or the left or right edge, the confidence or certainty that it is an obstacle is believed to be great such that the initial value of the degree is determined to be great.

On the other hand, if the position at which the obstacle is detected for the first time is relatively shorter than the farthest distal end and is at or close to the center of the radar detection range, it may be a metal piece or a sheet of paper blowing in the wind. The confidence or certainty that it is an obstacle (typically another vehicle) is believed to small and hence, the initial value of the degree is determined to be small.

Figure 20:
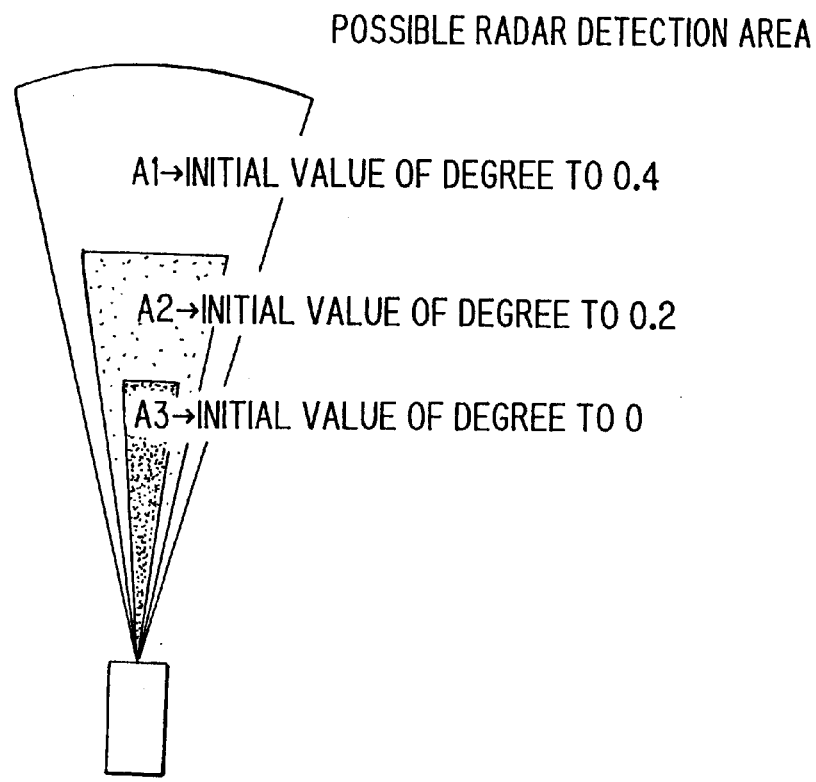
FIG. 20 is an explanatory view explaining the operation referred to in the flow chart of FIG. 19.

More specifically, as illustrated in FIG. 20, if the first detected position is within area A1, the initial value of the degree is determined to be 0.4; if it is within area A2, the value is determined to be 0.2; and if it is within area A3, the value is determined to be 0. It is preferable to change the values in response to the degradation of the radar detection accuracy.

When the result in S1002 is negative, since this indicates that the obstacle was also detected in the previous time (last program loop), the program proceeds to S1006 in which the degree of certainty of obstacle is added to by a prescribed amount to increase the same. The program then proceeds to S1008 in which the degree of certainty of obstacle is limited based on the intensity of received energy of the laser radar 12.

Figure 21:
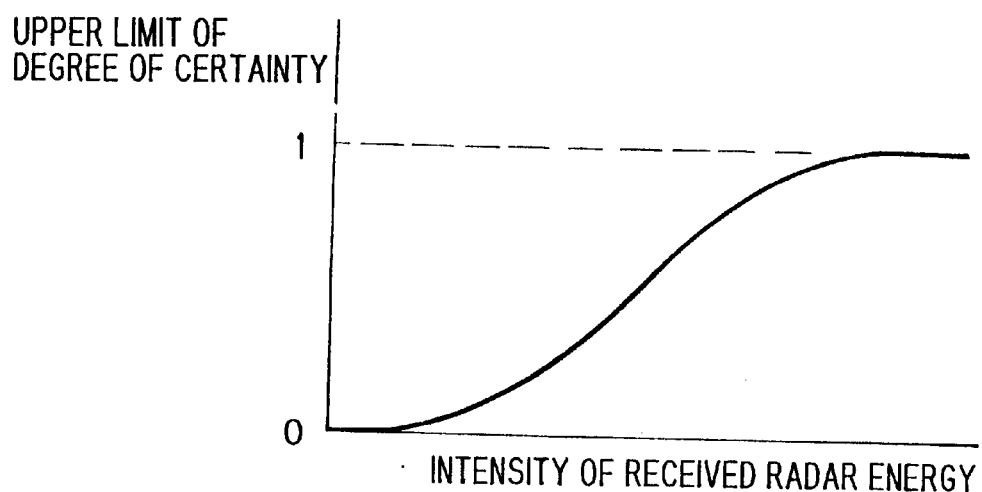
FIG. 21 is an explanatory view further explaining the operation referred to in the flow chart of FIG. 19.

More specifically, a reference degree of certainty of obstacle is predetermined with respect to the intensity of received energy of the laser radar 12, as illustrated in FIG. 21. The calculated degree is compared with the reference value and if the calculated degree is found to exceed the reference value, the calculated degree is limited to the reference value. As mentioned above, the upper limit of the degree is 1.0.

When the result in S1000 is negative, the program proceeds to S1010 in which it is determined whether the obstacle was detected in the last program loop, and if the result is negative, since this and the last program loop did not detect any obstacle, the program is immediately terminated. On the other hand, if the result in S1010 is affirmative, since this means that the detected obstacle is lost (missed) in this time (this program loop), the program proceeds to S1012 in which a prescribed amount is determined based on the detection before the obstacle went out of sight and is subtracted from the degree to decrease the same.

Figure 22:
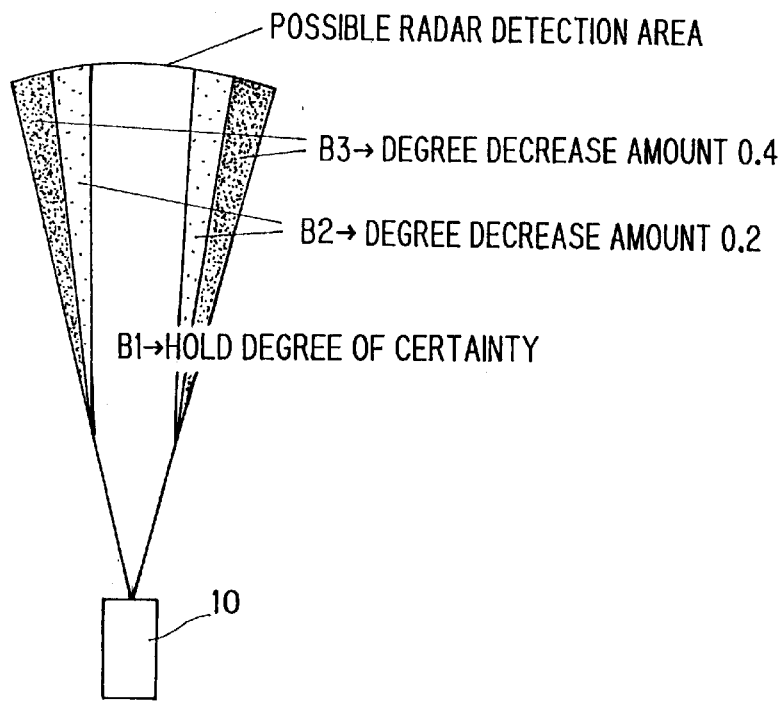
FIG. 22 is an explanatory view further explaining the operation referred to in the flow chart of FIG. 19.

Specifically, the amount is determined by retrieving characteristics, shown in FIG. 22, prepared in advance by the last detected position, more precisely the last position before the detected obstacle was lost. If the last position is at the right or left edge of the detection area, it can be believed that the obstacle moved in the lateral direction or the subject vehicle itself moved in the lateral direction and avoided it. If this is the case, since the possibility of contact is believed to be little, the degree of certainty of obstacle is decreased. However, if the last position is close to the subject vehicle, since the possibility of contact still exists even if the obstacle is out of sight, the degree is kept unchanged.

More specifically, if the last position is within B1, the degree of certainty of obstacle is kept unchanged; if it is within B2, the degree is decreased by 0.2; and if it is within B3, the degree is decreased by 0.4.

Figure 23:
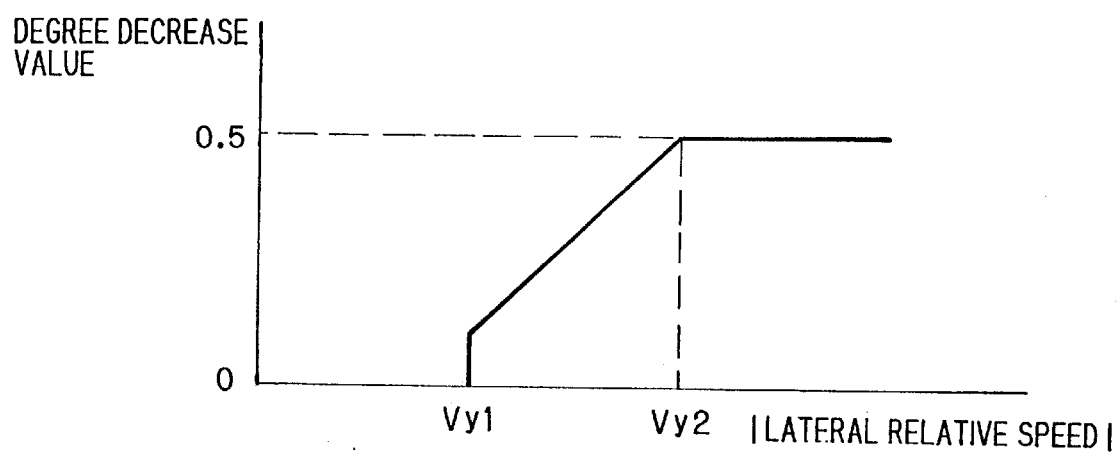
FIG. 23 is an explanatory view further explaining the operation referred to in the flow chart of FIG. 19.

Moreover, if the obstacle moving speed (displacement speed) in the lateral direction relative to the subject vehicle is great, the obstacle might have crossed before the subject vehicle and hence, the possibility of contact is low. Therefore, as illustrated in FIG. 23, it will be preferable to predetermine the decrease amount of the degree with respect to the relative speed in the lateral direction of the obstacle. Since, the direction, i.e., right or left is not significant, the lateral relative speed should be determined in terms of absolute value such that the decrease amount (ranging from 0 to 0.5) is retrieved from the illustrated characteristic by the calculated lateral relative speed. The decrease amount may be used together with the amount shown in FIG. 22, or may be used instead.

Furthermore, it may be possible to determine whether the obstacle moves toward the subject vehicle based on the last position and the lateral relative speed, and if it is found not to, to decrease the degree of certainty.

Figure 24:
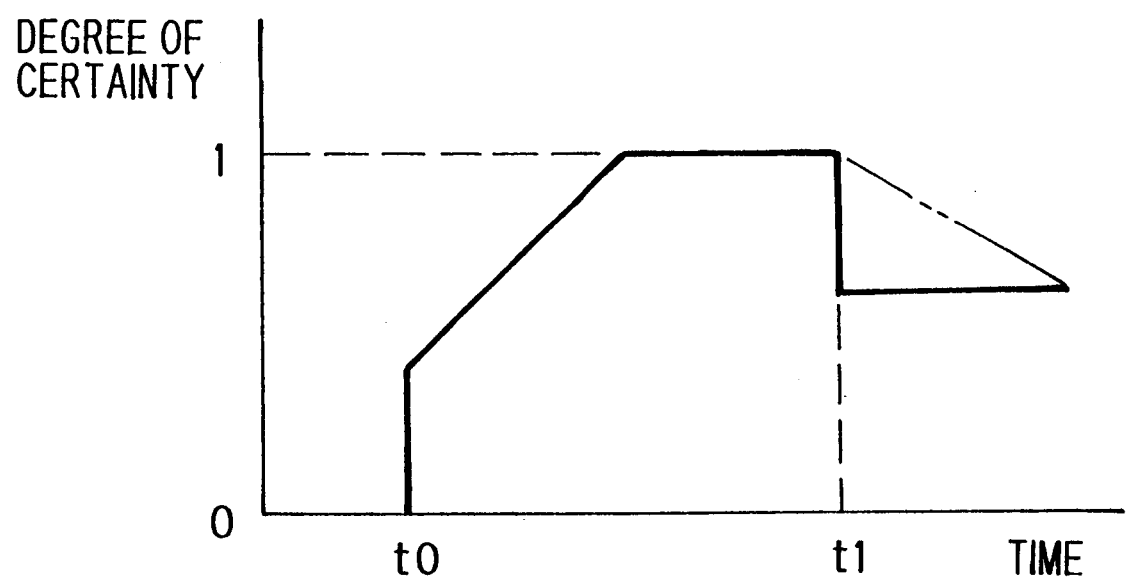
FIG. 24 is a time chart showing the transit of the degree of certainty determined in the flow chart of FIG. 19 with respect to time.

FIG. 24 illustrates one example of the transit of degree of certainty with respect to time. Assuming that the obstacle is detected at time t0, the degree of certainty is set to the initial value. If the obstacle is continuously detected, the degree of certainty is gradually increased with respect to time.

If the obstacle is lost at time t1, the degree of certainty is decreased in response to the aforesaid situation. In the illustrated example, the decrease amount is set to be a large amount to decrease the degree of certainty sharply as shown by the solid line. The decrease amount may alternatively set to be smaller such that the degree of certainty decreases gradually as shown by the phantom line.

It should further be noted that, although the initial value of the degree of certainty is determined in S1004 based on the relative position (detected position) of the obstacle, it is alternatively possible to determine the initial value based on the intensity of reflected energy of radar 12 using the characteristic illustrated in FIG. 21. In that case, S1008 should be deleted or is left, but other characteristics should be prepared.

Returning to the explanation of FIG. 17, the program proceeds to S902 in which it is determined whether the obstacle is lost during the automatic braking operation, and if the result is negative, the program proceeds to S904 in which the deceleration command value is determined or calculated based on the data detected in this time (program loop) in the manner shown in FIG. 18.

On the other hand, if the result in S902 is affirmative, the program proceeds to S906 in which the obstacle information is estimated based on the detected data before it was lost in the same manner as that mentioned for S100 in the flow chart of FIG. 4.

The program then proceeds to S908 in which it is determined whether the degree of certainty exceeds a predetermined value (such as 0.6), and if the result is affirmative, since the degree assigned to the obstacle is high, the program proceeds to S910 in which the deceleration command value is determined based on the estimated information obtained in the same manner as that mentioned in the first embodiment. If the result in S908 is negative, since the degree is believed to be not high, the program proceeds to S912 in which the deceleration command value is determined based on the degree of certainty, more specifically, the deceleration command value remains unchanged or is decreased.

Figure 25:
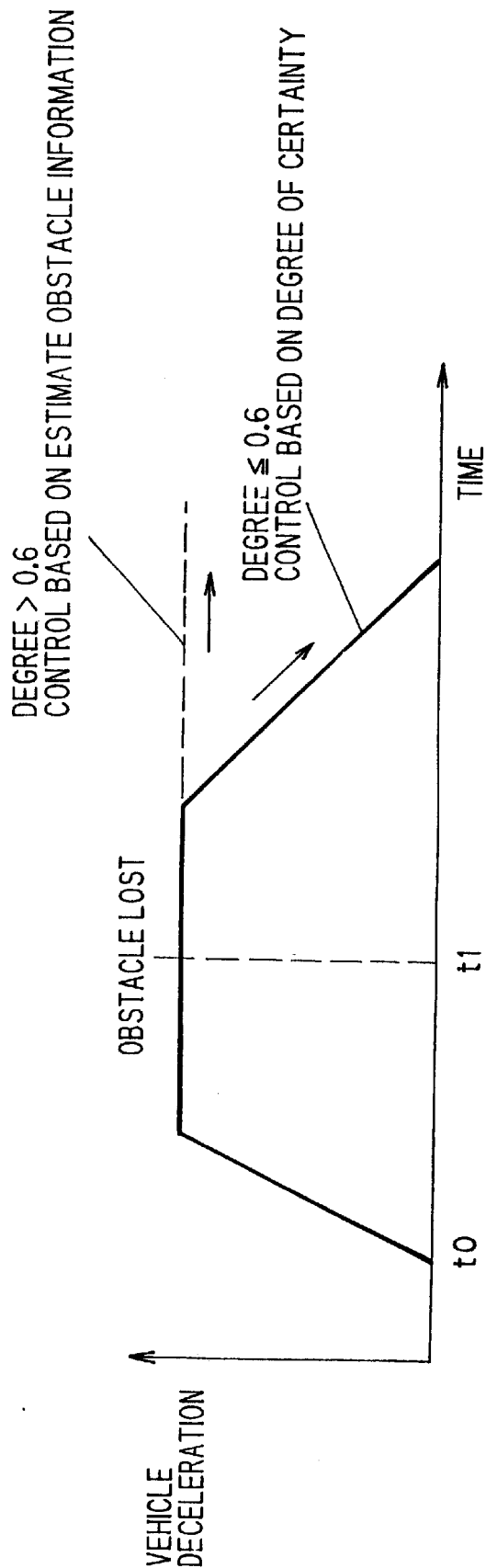
FIG. 25 is a time chart showing the operation illustrated in the flow chart of FIG. 17.

FIG. 25 is a time chart, similar to FIG. 13, but showing the procedures illustrated in the flow chart of FIG. 17. Assuming that the automatic braking operation is started at time t0 and the obstacle is lost at time t1, the automatic braking operation is conducted based on the estimated obstacle information when the degree of certainty exceeds the predetermined value (0.6).

Figure 26:
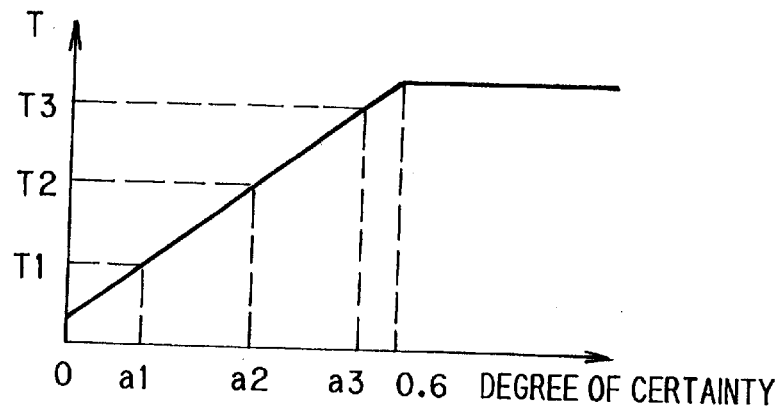
FIG. 26 is an explanatory graph showing the characteristic of a table referred to in the flow chart of FIG. 17.

On the other hand, when the degree of certainty is not more than the predetermined value, the automatic braking operation is conducted based on the degree of certainty. Specifically, this is done by retrieving a table (whose characteristics are illustrated in FIG. 26) using the degree of certainty as an address datum to determine a time or period Tn (n: 1–3) during which the deceleration (now being applied) is held. As illustrated, the time Tn decreases with decreasing degree of certainty.

Figure 27:
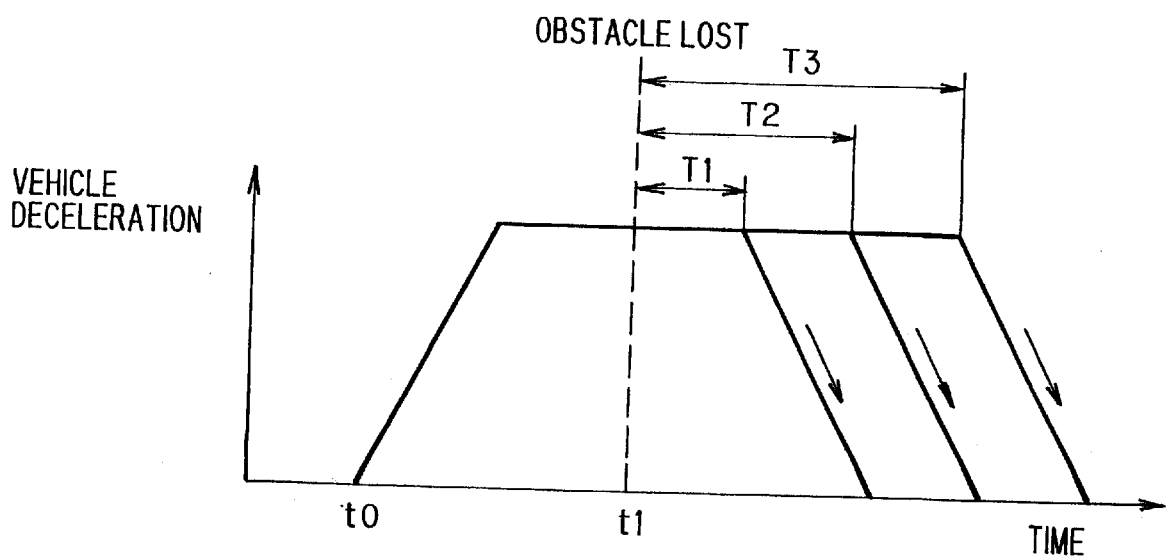
FIG. 27 is an explanatory graph showing the characteristic of a table referred to in the flow chart of FIG. 17.

More specifically, as illustrated in FIG. 27, time lapse is measured and when the time reaches the retrieved value Tn, the operation of the braking system 22 is terminated or discontinued.

Having been configured in the foregoing manner, the ninth embodiment is configured such that, when the obstacle, once detected, is lost or missed, the degree of certainty of obstacle is determined based on the detection information obtained before the time and when the determined degree of certainty exceeds the predetermined value, the automatic braking operation for contact avoidance is conducted based on the estimated information, while the operation is conducted based on the degree of certainty when the degree of certainty is not more than the predetermined value.

With this arrangement, the system according to the ninth embodiment can appropriately cope with a situation in which an obstacle, once detected, is lost, by determining the degree of certainty of obstacle and by controlling the operation of an automatic braking operation based on the determined degree of certainty, thereby preventing the driving feeling or comfort from being degraded and the vehicle driver from experiencing annoyance, while ensuring obstacle avoidance without fail.

Moreover, the automatic braking operation or vehicle deceleration is held for a predetermined time and then terminated even if the presence of the obstacle or object is uncertain, in other words, the automatic braking operation is not terminated suddenly, thereby preventing the driving feeling or comfort from being degraded and the vehicle driver from experiencing annoyance more effectively, while ensuring obstacle avoidance without fail.

Furthermore, the time to hold the automatic braking operation or vehicle deceleration is set to decrease with decreasing degree of certainty of obstacle, thereby enabling the system to determine the time to continue the automatic braking operation properly, while ensuring obstacle avoidance without fail.

Figure 28:
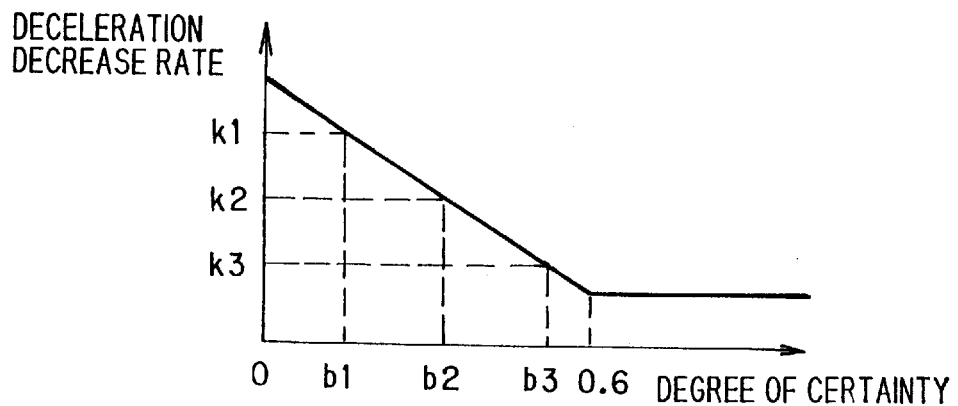
FIG. 28 is a graph, similar to FIG. 26, but showing the operation of the system according to a tenth embodiment of the invention.
Figure 29:
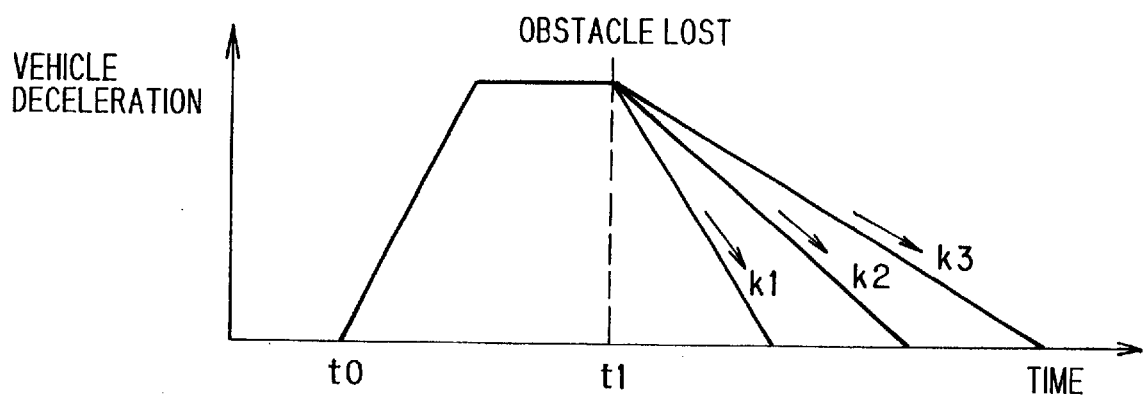
FIG. 29 is a time chart showing the operation of the system illustrated in FIG. 28.

FIG. 28 and FIG. 29 are views, similar to FIG. 26 and FIG. 27, but showing the operation of the system according to a tenth embodiment of the invention, which shows the operation of S912 in the flow chart of FIG. 17.

In the tenth embodiment, the rate of decrease of the vehicle deceleration (i.e., the speed to terminate or relieve the automatic braking operation) is determined based on the degree of certainty. Specifically, the degree of certainty is used to retrieve a table (whose characteristics are shown in FIG. 28) to determine the rate of decrease (coefficient) kn (n: 1–3). As illustrated, the rate of decrease kn increases with decreasing degree of certainty, in other words, the vehicle deceleration is decreased earlier as the degree certainty decreases.

As illustrated in a time chart of FIG. 29, the braking system 22 is made inoperable in response to the retrieved rate of decrease kn. In contrast with the ninth embodiment shown in FIG. 25, the decrease of the vehicle deceleration is immediately started when it is determined the obstacle is lost. The rest of the tenth embodiment is the same as that of the ninth embodiment.

With this arrangement, similarly to the ninth embodiment, the system according to the tenth embodiment can appropriately cope with a situation in which an obstacle, once detected, is lost, by determining the degree of certainty of obstacle and by controlling the operation of an automatic braking operation based on the determined degree of certainty, thereby preventing the driving feeling or comfort from being degraded and the vehicle driver from experiencing annoyance, while ensuring obstacle avoidance without fail.

Moreover, the system is configured such that the rate of decrease of the vehicle deceleration increases with decreasing degree of certainty, in other words, the time to continue the automatic braking operation is shortened as the confidence that the detected was an obstacle decreases, i.e., the need to decelerate decreases. With this procedure, the time to hold the automatic braking operation or vehicle deceleration can be determined more properly.

Figure 30:
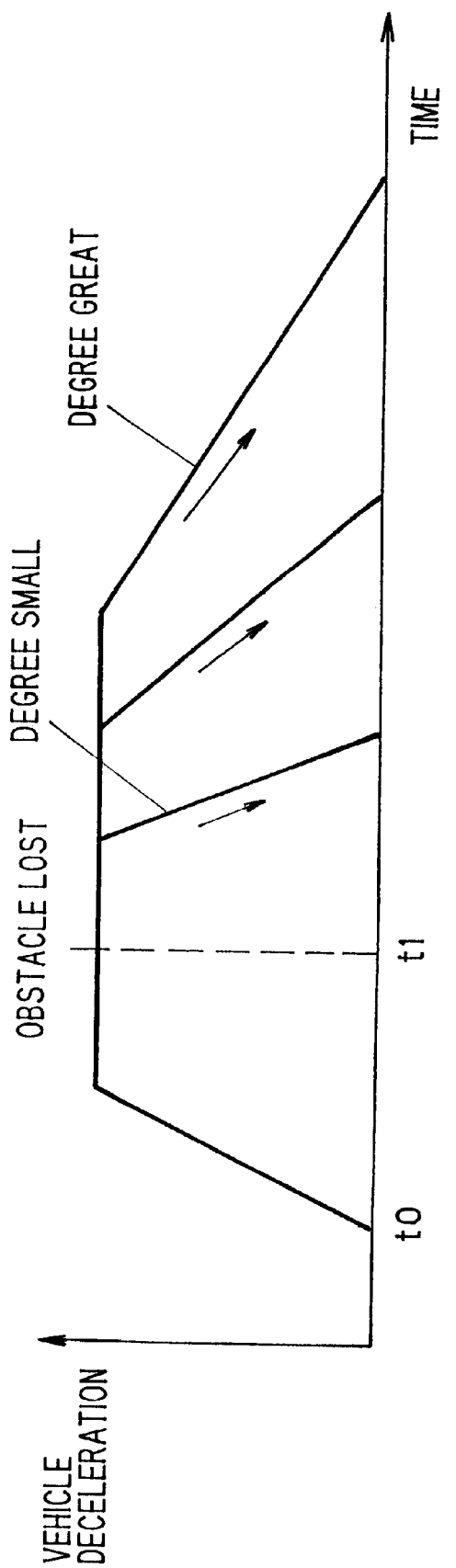
FIG. 30 is a time chart, similar to FIG. 29, but showing the operation of the system according to an eleventh embodiment of the invention.

FIG. 30 is a time chart, similar to FIG. 29, but showing the operation of the system according to an eleventh embodiment of the invention, which also shows the operation of S912 in the flow chart of FIG. 17.

As illustrated in the figure, in the eleventh embodiment, both the time to hold the vehicle deceleration and the rate of decreasing the vehicle deceleration (i.e., the speed to terminated or relieve the automatic braking operation) is determined based on the degree of certainty. Specifically, when the degree of certainty is great, the time is made long and the decreasing speed is small. On the other hand, when the degree of certainty is small, the time is shortened and the decreasing speed is enlarged. The rest of the eleventh embodiment is the same as that of the ninth embodiment.

With this arrangement, similarly to the ninth embodiment, the system according to the eleventh embodiment can appropriately cope with a situation in which an obstacle, once detected, is lost, by determining the degree of certainty of obstacle and by controlling the operation of an automatic braking operation based on the determined degree of certainty, thereby preventing the driving feeling or comfort from being degraded and the vehicle driver from experiencing annoyance, while ensuring obstacle avoidance without fail.

Moreover, the system according to the eleventh embodiment can determine the time to continue the automatic braking operation more properly when the obstacle is lost.

The foregoing embodiments are configured to provide for a system for controlling safety running of a vehicle (10), including: obstacle detecting means (laser radar 12, radar output processing unit 14, ECU 16) for detecting an obstacle (100) present ahead on a course of travel of the vehicle; and vehicle device operating means (ECU 16) for operating a device (braking system 22) of the vehicle to conduct maneuvers necessary for avoiding contact with the obstacle. In the system, the vehicle device operating means (ECU 16, S10–S22, S100–S108, S200–S210, S300–S310, S400–S408, S500–S512, S600–S610, S700–S710, S800–S812, S900–S912, S1000–S1012) controls operation of the device based on a parameter (possibility of contact, degree of certainty of obstacle) relating to the obstacle when it is found that the obstacle detected by the obstacle detecting means is lost.

It should be noted here that the words "operating a device of the vehicle to conduct maneuvers necessary for avoiding contact with the obstacle" includes to operate the braking system in the embodiments as mentioned above. However, this further includes to operate the alarm system 40 to alert the vehicle driver, to operate a steering system (not shown) to avoid the contact, to gear shift or to cut fuel supply to the engine so as to decrease drive output to decelerate the vehicle, etc.

In the system, the device is a braking system (22) to brake the vehicle (10); and it further includes: vehicle speed detecting means (vehicle speed sensor 22, ECU 16) for detecting a speed of the vehicle (V); relative distance determining means (laser radar 12, radar output processing unit 14, ECU 16, first block for calculating quantities of state, S100, S200, S300, S400, S500) for determining a distance of the obstacle relative to the vehicle (X, X1) based on a detection result of the obstacle detecting means; relative speed detecting means (laser radar 12, radar output processing unit 14, ECU 16, first block for calculating quantities of state, S100, S200, S300, S400, S500) for determining a speed of the obstacle relative to the vehicle ($\Delta V1$, $\Delta V1$, $\Delta V2$) based on a detection result of the obstacle detecting means; contact possibility determining means (ECU 16, second block for determining automatic braking operation, S12, S100–S108, S200–S210, S300–S308, S400–S408, S500–S512, S600–S608, S700–S708, S800–S806) for determining possibility of contact with the obstacle as the parameter based on the determined relative distance and relative speed; and braking system operating means (ECU 16, third block for calculating a deceleration command value, S18–S22, S100–S108, S602–S610, S702–S710, S802–S812) for operating the braking system to brake the vehicle at the deceleration based on the determined possibility of contact; wherein, if the obstacle is lost when the braking system is being operated, the contact possibility determining means determines the possibility of contact based on a detection result of the obstacle detecting means obtained before the obstacle was lost.

In the system, the contact possibility determining means determines the possibility of contact, if the obstacle is lost when the braking system is being operated, determines the relative distance (prospective relative distance X) based on the detection result of the obstacle detecting means obtained before the obstacle was lost, and when the determined relative distance (X) is not more than a first predetermined value (Lc1), determines the possibility of contact to be great (ECU 16, second block for determining automatic braking operation, S12, S100–S108).

In the system, if the obstacle is lost when the braking system is being operated, the contact possibility determining means determines the possibility of contact, determines the relative distance (prospective relative distance X) based on the detection result of the obstacle detecting means obtained before the obstacle was lost, and when the determined relative distance (X) is not more than a second predetermined value (Lc2) and when the relative speed (prospective relative speed ΔV2) is not less than a third predetermined value (Vc), determines the possibility of contact to be great (ECU 16, second block for determining automatic braking operation, S12, S200–S210).

In the system, the braking system operating means increases the deceleration by an amount with respect to time when the possibility of contact is determined to be great (ECU 16, third block for calculating a deceleration command value, S18–S22, S602–S610, S702–S710, S802–S812).

The system further includes; steer determining means (steer angle sensor 21, ECU 16) for determining whether the steering is operated; and wherein the braking system operating means terminates increasing the deceleration or decreases a rate of increasing the deceleration when the steering determining means determines that the steering is operated (ECU 16, third block for calculating a deceleration command value, S604–S606, S704–S706).

In the system, if the obstacle is lost when the braking system is being operated, the contact possibility determining means determines the possibility of contact, determines the relative distance based on the detection result of the obstacle detecting means obtained before the obstacle was lost, and when the determined relative distance is not more than a fourth predetermined value (zero), determines the possibility of contact to be small (ECU 16, second block for determining automatic braking operation, S306–S308, S506–S512).

In the system, if the obstacle is lost when the braking system is being operated, the contact possibility determining means determines the possibility of contact, determines the relative distance based on the detection result of the obstacle detecting means obtained before the obstacle was lost, and when the relative speed is not more than a fifth predetermined value (zero), determines the possibility of contact to be small (ECU 16, second block for determining automatic braking operation, S306–S308, S506–S512).

The system further includes: a lateral relative position determining means for determining a position (d) of the obstacle relative to the vehicle in a vehicle-width direction (ECU 16, S400, S500); and wherein, if the obstacle is lost when the braking system is being operated, the contact possibility determining means determines the possibility of contact, determines the lateral relative position based on the detection result of the lateral relative position determining means obtained before the obstacle was lost, and determines that the vehicle has avoided the obstacle based on the determined relative position, determines the possibility of contact to be small (ECU 16, second block for determining automatic braking operation, S406, S408, S512, S508).

In the system, the braking system operating means decreases the deceleration by an amount with respect to time when the possibility of contact is determined to be small (ECU 16, third block for calculating a deceleration command value, S18–S22, S602–S610, S702–S710, S802–S812).

In the system, the braking system operating means terminates operation of the braking system when the deceleration is not more than a prescribed value (0.1 G; ECU 16, third block for calculating a deceleration command value, S810–S812).

The system further includes: degree of certainty determining means (ECU 16, second block for determining automatic braking operation, S900, S1000–S1012) for determining a degree of certainty to determine whether the detected by the obstacle detecting means is, in fact, the obstacle, as the parameter, when the detected obtained by the obstacle detecting means is lost; and wherein the vehicle device operating means controls operation of the device based on the determined degree of certainty (ECU 16, third block for calculating a deceleration command value, S902–912).

In the system, the certainty degree determining means determines an initial value of the degree of certainty based on a position (An, Bn) of the detected relative to the vehicle (ECU 16, second block for determining automatic braking operation, S900, S1004).

In the system, the degree of certainty determining means determines the initial value of the degree of certainty to be small when at least one of the relative position (An) in a vehicle longitudinal direction of the detected at which it is obtained for the first time and the lateral relative position (Bn) from the center position of teh vehicle in the vehicle-width direction, is small (ECU 16, second block for determining automatic braking operation, S900, S1004).

In the system, the degree of certainty determining means determines the degree of certainty based on at least one of a time duration of detection and an intensity of received energy of detection obtained by the obstacle detecting means (ECU 16, second block for determining automatic braking operation, S900, S1004).

In the system, the degree of certainty determining means determines the degree of certainty based on a time duration of detection and determines the degree of certainty to be increased as the time increases (ECU 16, second block for determining automatic braking operation, S900, S1004).

In the system, the degree of certainty determining means decreases the degree of certainty based on a position of the detected relative to the vehicle at which the detected was lost (ECU 16, second block for determining automatic braking operation, S900, S1012).

In the system, the degree of certainty determining means decreases the degree of certainty based on a speed of the detected relative to the vehicle at which the detected was lost (ECU 16, second block for determining automatic braking operation, S900, S1012.

The system further includes: braking system operating means (ECU 16, second block for determining automatic braking operation, S900–S912), for operating a braking system (22) to brake the vehicle at a deceleration based on the determined degree of certainty; and information estimating means (ECU 16, first block for calculating quantities of state, S906) for estimating information concerning at least one of a position and a speed of the obstacle, if the detected is lost when the braking system is being operated, based on the detection result of the obstacle detecting means obtained before the detected was lost; and wherein the braking system operates the braking system based on the information when the degree of certain is determined to be great, if the detected is lost during operating the braking system, while operating the braking system based on the degree of certainty when the degree of certain is determined to be small, if the detected is lost during operation of the braking system, for operating a braking system (22; ECU 16, second block for determining automatic braking operation, S900–S912).

In the system, the braking system operating means operates the braking system for a time which decreases with decreasing degree of certainty (ECU 16, second block for determining automatic braking operation, S900–S912).

In the system, the braking system operating means operates the braking system to change a rate of the deceleration based on the degree of certainty (ECU 16, second block for determining automatic braking operation, S900–S912).

It should further be noted that, although the laser radar 12 is used as a means for detecting the other vehicle (obstacle), a millimeter-wave radar 14 or a visionary sensor such as a CCD camera may instead be used.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling safety running of a vehicle, comprising:

obstacle detecting means for detecting an obstacle present ahead on a course of travel of the vehicle;

a braking system for braking the vehicle;

vehicle speed detecting means for detecting a speed of the vehicle;

relative distance determining means for determining a distance of the obstacle relative to the vehicle based on a detection result of the obstacle detecting means;

relative speed detecting means for determining a speed of the obstacle relative to the vehicle based on a detection result of the obstacle detecting means;

contact possibility determining means for determining possibility of contact with the obstacle based on the determined relative distance and relative speed; and braking system operating means for operating the braking system to brake the vehicle at the deceleration based on the determined possibility of contact;

wherein, if the obstacle is lost when the braking system is being operated, the contact possibility determining means determines the possibility of contact based on a detection result of the obstacle detecting means obtained before the obstacle was lost.

2. A system according to claim 1, wherein, if the obstacle is lost when the braking system is being operated, the contact possibility determining means determines the possibility of contact, determines the relative distance based on the detection result of the obstacle detecting means obtained before the obstacle was lost, and when the determined relative distance is not more than a first predetermined value, determines the possibility of contact to be great.

3. A system according to claim 1, wherein, if the obstacle is lost when the braking system is being operated, the contact possibility determining means determines the possibility of contact, determines the relative distance based on the detection result of the obstacle detecting means obtained before the obstacle was lost, and when the determined relative distance is not more than a second predetermined value and when the relative speed is not less than a third predetermined value, determines the possibility of contact to be great.

4. A system according to claim 1, wherein the braking system operating means increases the deceleration by an amount with respect to time when the possibility of contact is determined to be great.

5. A system according to claim 1, further including;
   steer determining means for determining whether the steering is operated;
   and wherein the braking system operating means terminates increasing the deceleration when the steering determining means determines that the steering is operated.

6. A system according to claim 1, further including;
   steer determining means for determining whether the steering is operated;
   and wherein the braking system operating means decreases a rate of increasing the deceleration when the steering determining means determines that the steering is operated.

7. A system according to claim 1, wherein, if the obstacle is lost when the braking system is being operated, the contact possibility determining means determines the possibility of contact, determines the relative distance based on the detection result of the obstacle detecting means obtained before the obstacle was lost, and when the determined relative distance is not more than a fourth predetermined value, determines the possibility of contact to be small.

8. A system according to claim 1, wherein, if the obstacle is lost when the braking system is being operated, the contact possibility determining means determines the possibility of contact, determines the relative distance based on the detection result of the obstacle detecting means obtained before the obstacle was lost, and when the relative speed is not more than a fifth predetermined value, determines the possibility of contact to be small.

9. A system according to claim 1, further including:
   a lateral relative position determining means for determining a position of the obstacle relative to the vehicle in a vehicle-width direction;
   and wherein, if the obstacle is lost when the braking system is being operated, the contact possibility determining means determines the possibility of contact, determines the lateral relative position based on the detection result of the lateral relative position determining means obtained before the obstacle was lost, and if it is determined that the vehicle has avoided the obstacle based on the determined relative position, determines the possibility of contact to be small.

10. A system according to claim 1, wherein the braking system operating means decreases the deceleration by an amount with respect to time when the possibility of contact is determined to be small.

11. A system according to claim 1, wherein the braking system operating means terminates operation of the braking system when the deceleration is not more than a prescribed value.

12. A system for controlling safety running of a vehicle, including:

obstacle detecting means for detecting an obstacle present ahead on a course of travel of the vehicle;

vehicle device operating means for operating a device of the vehicle to avoid contact with the obstacle;

degree of certainty determining means for determining a degree of certainty of obstacle to determine whether the detected by the obstacle detecting means is, in fact, the obstacle, when the detected obtained by the obstacle detecting means is lost;

braking system operating means for operating a braking system to brake the vehicle at a deceleration based on the determined degree of certainty; and information estimating means for estimating information concerning at least one of a position and a speed of the obstacle, if the detected is lost when the braking system is being operated, based on the detection result of the obstacle detecting means obtained before the detected was lost, wherein the braking system operates the braking system based on the information when the degree of certain is determined to be great, if the detected is lost during operating the braking system, and wherein the vehicle device operating means controls operation of the device based on the determined degree of certainty.

13. A system according to claim 12, wherein the braking system operating means operates the braking system for a time which decreases with decreasing degree of certainty.

14. A system according to claim 12, wherein the braking system operating means operates the braking system to change a rate of the deceleration based on the degree of certainty.

15. A system for controlling safety running of a vehicle, including:

obstacle detecting means for detecting an obstacle present ahead on a course of travel of the vehicle;

vehicle device operating means for operating a device of the vehicle to avoid contact with the obstacle;

degree of certainty determining means for determining a degree of certainty of obstacle to determine whether the detected by the obstacle detecting means is, in fact, the obstacle, when the detected obtained by the obstacle detecting means is lost;

braking system operating means for operating a braking system based on the determined degree of certainty such that the vehicle decelerates; and information estimating means for estimating information concerning at least one of a position and a speed of the obstacle, if the detected is lost when the braking system is being operated, based on a detecting result of the obstacle detecting means obtained before the detected was lost, wherein the braking system operating means operates the braking system based on the degree of certainty when the degree of certain is determined to be small, if the detected is lost during operation of the braking system and wherein the vehicle device operating means controls operation of the device based on the determined degree of certainty.

16. A system according to claim 15, wherein the braking system operating means operates the braking system for a time which decreases with decreasing degree of certainty.

17. A system according to claim 15, wherein the braking system operating means operates the braking system to change a rate of the deceleration based on the degree of certainty.

* * * * *